United States Patent
LaValley et al.

(10) Patent No.: US 10,184,304 B2
(45) Date of Patent: Jan. 22, 2019

(54) ATTACHMENT FOR MAKING UP OR BREAKING OUT PIPE

(71) Applicant: LAVALLEY INDUSTRIES, LLC, Bemidji, MN (US)

(72) Inventors: Jason LaValley, Bemidji, MN (US); Daniel L. Larson, Bagley, MN (US); Roger LaValley, Bemidji, MN (US); Marvin N. Larson, Bemidji, MN (US); Rodney Wurgler, York, ND (US); Christopher G. Kay, Roseville, MN (US); Matthew J. Michel, St. Paul, MN (US); Jesse J. Kilde, Blackduck, MN (US)

(73) Assignee: LaValley Industries, LLC, Bemidji, MN (US)

( * ) Notice: Subject to any disclaimer, the term of this patent is extended or adjusted under 35 U.S.C. 154(b) by 528 days.

(21) Appl. No.: 14/555,945

(22) Filed: Nov. 28, 2014

(65) Prior Publication Data
US 2015/0082598 A1   Mar. 26, 2015

Related U.S. Application Data

(60) Continuation of application No. 13/922,359, filed on Jun. 20, 2013, now Pat. No. 9,493,996, which is a
(Continued)

(51) Int. Cl.
*B25B 17/00*   (2006.01)
*B25B 29/00*   (2006.01)
(Continued)

(52) U.S. Cl.
CPC ............ *E21B 19/164* (2013.01); *B66C 1/427* (2013.01); *B66C 1/68* (2013.01); *B66C 3/005* (2013.01);
(Continued)

(58) Field of Classification Search
CPC ...... E21B 19/16; E21B 19/162; E21B 19/163; E21B 19/164; E21B 19/20; E21B 19/168; E21B 19/087; E21B 19/15; E21B 19/155
(Continued)

(56) References Cited

U.S. PATENT DOCUMENTS

| 2,668,689 A | 2/1954 | Cormany |
| 3,392,609 A | 7/1968 | Bartos |

(Continued)

FOREIGN PATENT DOCUMENTS

| CA | 2641321 | 4/2009 |
| DE | 29502091.1 | 4/1995 |
| WO | 00/65193 | 11/2000 |

OTHER PUBLICATIONS

CD containing video of Prime Drilling Abdrehvorrichtung; obtained from http://www.youtube.com/watch?v=FhUjSo6S-whs; allegedly posted Aug. 16, 2012.
(Continued)

*Primary Examiner* — Bryan R Muller
(74) *Attorney, Agent, or Firm* — Hamre, Schumann, Mueller & Larson, P.C.

(57) ABSTRACT

An attachment is described that is configured for attachment to an arm of a piece of heavy construction equipment. The attachment is configured to rotate a section of pipe during break out (i.e. disconnection or disassembly) from another section of pipe and/or make up (i.e. connection or assembly) with another section of pipe. The attachment is configured to break the joint or torque the joint to a predetermined torque value, unthread or thread pipe, and lift the pipe under the power of the heavy construction equipment.

12 Claims, 17 Drawing Sheets

Related U.S. Application Data division of application No. 13/480,961, filed on May 25, 2012, now Pat. No. 8,490,519.

(60) Provisional application No. 61/490,428, filed on May 26, 2011.

(51) Int. Cl.
| | |
|---|---|
| *E21B 19/16* | (2006.01) |
| *E21B 19/087* | (2006.01) |
| *E02F 3/96* | (2006.01) |
| *B66C 1/42* | (2006.01) |
| *B66C 1/68* | (2006.01) |
| *B66C 3/00* | (2006.01) |
| *F16L 1/06* | (2006.01) |
| *F16L 1/09* | (2006.01) |

(52) U.S. Cl.
CPC ............ *E02F 3/965* (2013.01); *E21B 19/087* (2013.01); *E21B 19/16* (2013.01); *E21B 19/161* (2013.01); *E21B 19/163* (2013.01); *F16L 1/065* (2013.01); *F16L 1/09* (2013.01); *Y10T 29/49822* (2015.01); *Y10T 29/49826* (2015.01); *Y10T 137/0441* (2015.04)

(58) Field of Classification Search
USPC ....... 81/57.15–57.35; 294/104, 106; 405/140
See application file for complete search history.

(56) References Cited

U.S. PATENT DOCUMENTS

| | | | | |
|---|---|---|---|---|
| 3,711,047 | A * | 1/1973 | O'Leary | E21B 19/24 |
| | | | | 173/193 |
| 3,734,210 | A * | 5/1973 | Wilderman | 175/85 |
| 4,364,540 | A * | 12/1982 | Montabert | E21B 7/025 |
| | | | | 173/195 |
| 4,497,224 | A | 2/1985 | Jurgens | |
| 5,018,588 | A * | 5/1991 | Haberer | E21D 20/006 |
| | | | | 173/164 |
| 5,060,542 | A | 10/1991 | Hauk | |
| 5,129,764 | A * | 7/1992 | Casagrande | E21D 20/003 |
| | | | | 405/140 |
| 5,386,746 | A | 2/1995 | Hauk | |
| 5,520,072 | A | 5/1996 | Perry | |
| 5,868,045 | A | 2/1999 | Hauk | |
| 6,280,119 | B1 | 8/2001 | Ryan et al. | |
| 6,634,443 | B1 * | 10/2003 | Paech | E21B 15/04 |
| | | | | 175/85 |
| 6,829,968 | B2 | 12/2004 | Hauk et al. | |
| 7,114,234 | B2 | 10/2006 | Penman et al. | |
| 8,146,971 | B2 | 4/2012 | LaValley et al. | |
| 8,328,071 | B2 | 12/2012 | LaValley et al. | |
| 2003/0205112 | A1 | 11/2003 | Hawkins | |
| 2004/0069097 | A1 * | 4/2004 | Hauk | E21B 19/165 |
| | | | | 81/57.16 |
| 2007/0240891 | A1 * | 10/2007 | Savi | E21B 15/003 |
| | | | | 173/184 |
| 2009/0057019 | A1 | 3/2009 | LaValley et al. | |
| 2009/0155040 | A1 | 6/2009 | Martin | |
| 2009/0211405 | A1 * | 8/2009 | Hunter | E21B 19/163 |
| | | | | 81/57.16 |
| 2010/0187740 | A1 * | 7/2010 | Orgeron | B25B 5/061 |
| | | | | 269/218 |
| 2010/0230166 | A1 * | 9/2010 | Sigmar | E21B 19/10 |
| | | | | 175/52 |
| 2010/0308609 | A1 | 12/2010 | LaValley et al. | |
| 2011/0030512 | A1 | 2/2011 | Begnaud | |
| 2011/0252926 | A1 | 10/2011 | Eglin et al. | |
| 2014/0151124 | A1 * | 6/2014 | Randall | E21B 19/163 |
| | | | | 175/52 |

OTHER PUBLICATIONS

European Search Report, Nov. 6, 2015, European Patent Application No. 12788935.0 (9 pages).

* cited by examiner

ATTACHMENT FOR MAKING UP OR BREAKING OUT PIPE

FIELD

This disclosure relates to a pipe handling attachment that is attachable to a prime mover, for example an excavator, crane, knuckle boom loader, trackhoe, backhoe, or other piece of heavy construction equipment for use in making up or breaking out pipe during assembly or disassembly of pipe.

BACKGROUND

When making up (i.e. connecting) or breaking out (i.e. disconnecting) drill pipe, casing, tubing, or other pipe, tongs are used. Manual tongs, which are effectively large wrenches, are known for manually turning the pipe during make up or break out of pipe. Power tongs or power wrenches are also known that are pneumatically or hydraulically operated tools that operate to rotate the pipe during make up or break out.

SUMMARY

A pipe handling attachment is described that is configured for attachment to an arm of a piece of heavy construction equipment, i.e. a prime mover, for example an excavator, crane, knuckle boom loader, a trackhoe, backhoe or the like. The attachment is configured to rotate a section of pipe during break out (i.e. disconnection or disassembly) from another section of pipe and/or make up (i.e. connection or assembly) with another section of pipe.

As described further below, make up of a pipe includes using the attachment to thread one end of a pipe or other threaded pipe element with another pipe or other threaded pipe element at a relatively lower torque value until the threads are substantially fully engaged, followed by use of the attachment to apply final torque to a predetermined torque value to complete the make up. As also described further below, break out of a pipe includes using the attachment to apply a high torque to break the joint, followed by unthreading of the pipe or other threaded pipe element at a relatively lower torque using the attachment.

As used throughout the specification and claims, the word pipe, unless otherwise specified, is intended to encompass drill pipe, casing, tubing, or other pipe designed to be connected by threads with other sections of pipe. The pipe can be made of any type of material including, but not limited to, metal or plastic. The word pipe also encompasses pipe accessories including, but not limited to, a reamer, hole opener, or any pipe element that is connected by threads to a section of pipe.

In addition, the pipes are described herein as having tool joints which are defined as enlarged and threaded ends of joints of drill pipe. However, the invention can be used with pipe other than drill pipe, as long as the pipe is designed to connect to a section of pipe via rotation of the pipe.

In one embodiment, the described attachment is configured to perform at least three primary functions. During a make up operation where a first section of pipe is connected to a second section of pipe, the attachment can pick up the first section of pipe, position the first section of pipe relative to the second section of pipe for connection, rotate the first section of pipe relative to the second section of pipe to thread the pipe sections together, and then torque the joint between the pipe sections to a predetermined torque value to complete the connection. During a break out operation where a first section of pipe is disconnected from a second section of pipe, similar functions are performed but in reverse order. That is, during break out, the attachment is configured to apply a relatively large torque to break the joint between the two pipe sections, rotate the first pipe section relative to the second pipe section to unscrew the first pipe section from the second pipe section, and lift the now disconnected first pipe section and place the first pipe section in another location, for example in a pipe stack on the ground or on a trailer.

Two of these functions involve rotation of the pipe by the attachment, one rotation occurring to initiate pipe break out to begin disconnection of the pipe sections or to torque the joint to a predetermined torque value to complete connection, and the other rotation occurring to unscrew the first pipe section from the second pipe section or to thread the first pipe section into the second pipe section. Therefore, it is to be understood that, unless otherwise noted, reference to rotation of the pipe section by the attachment encompasses either or both of the pipe break/joint torquing rotation and the pipe section unscrewing/screwing rotation.

It is also to be understood that, unless otherwise noted, reference to rotation of the pipe section by the attachment encompasses either or both of rotation during break out and during make up.

In one embodiment, the attachment includes a pipe break mechanism configured to be disposed over the joint between two sections of pipe and to grip one pipe while rotating the second pipe relative to the other to break or torque the joint. In addition, the attachment includes at least one pipe roller gripping assembly configured to rotate the second pipe relative to the first pipe to unscrew the second pipe from the first pipe or screw the second pipe into the first pipe. The attachment can also grip the unscrewed pipe and lift it for placement of the now removed pipe in another location. The attachment can also pick up a section of pipe that is to be connected to another section of pipe, such as from a pipe stack, and position the pipe relative to the other pipe to begin threading.

A pair of the pipe roller gripping assemblies can be used, disposed on opposite sides of the pipe break mechanism. During breaking or torqueing of the joint, the pipe roller gripping assemblies can be actuated out of the way to avoid interference with the pipe sections and the function of the pipe break mechanism.

DRAWINGS

DETAILED DESCRIPTION

Within reference to all figures in this application, when reference is made to the "a" side or the "b" side of the attachment, reference numbers will be followed with an "a" or "b" respectively as shown in the figures throughout this application. Unless otherwise noted herein or apparent from the drawings, the "a" and "b" side of the attachment are substantially identical in construction, operation and function.

Figure 1:
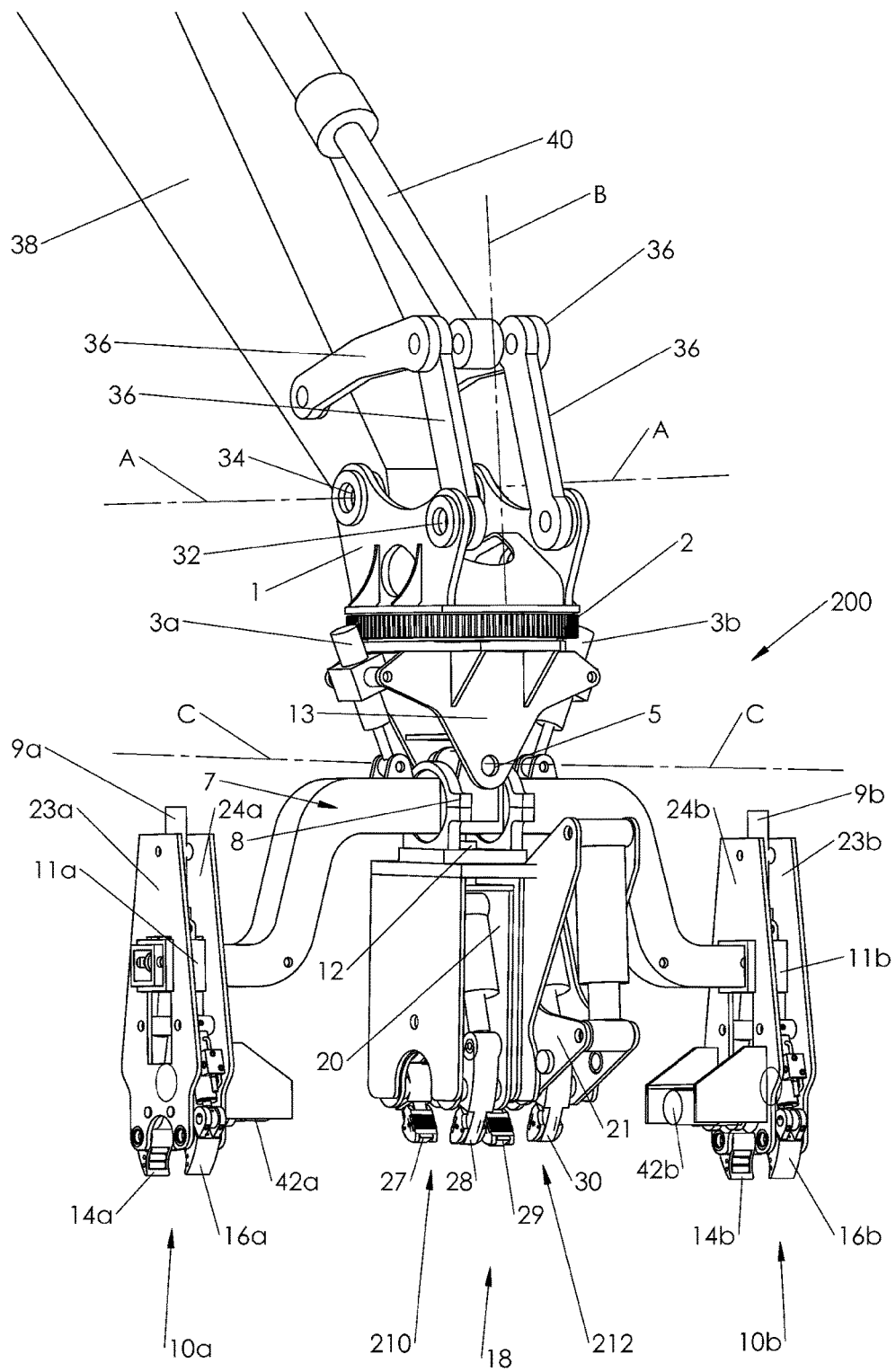
FIG. 1 is a perspective view of the pipe handling attachment mounted on a boom arm of prime mover.

With reference to FIG. 1, an attachment 200 is illustrated that is configured to rotate a section of pipe during break out (i.e. disconnection or disassembly) and/or make up (i.e. connection or assembly) with another section of pipe. The attachment 200 is suitably configured to mount to a piece of heavy construction equipment or prime mover (not illustrated). In the illustrated embodiment, the upper end of the attachment 200 includes an upper head 1 that is configured to mount to an excavator boom arm 38. However, the upper head 1 can be configured to adapt the attachment 200 to connect to other construction equipment or prime movers.

The upper head 1 includes a connection point 34 that is pivotally connected to the boom arm 38 by a pivot pin to allow the attachment 200 to pivot relative to the boom arm 38 about axis A, and connection points 32 that are pivotally connected by pivot pins to boom arm linkage 36 so that the upper head 1 can pivot relative to the linkage 36. A hydraulic actuating cylinder 40 of the prime mover is connected to the linkage 36 for pivoting the attachment 200 about the pivot pin of the connection point 34.

A slew bearing 2 is used to rotatably connect the upper head 1 to a lower head 13 so that the lower head 13 can rotate about an axis B through the center of the slew bearing 2. The axis B is substantially perpendicular to the axis A. It is believed at this time that the construction and operation of slew bearings, in general, is known in the art except for the gear teeth discussed below. The lower head 13 is attached to one rotating bearing race of the slew bearing 2 and the upper head 1 is attached to the other rotating bearing race of the slew bearing 2. The two bearing races of the slew bearing 2 permit the rotational movement of lower head 13 with respect to the upper head 1.

Figure 3:
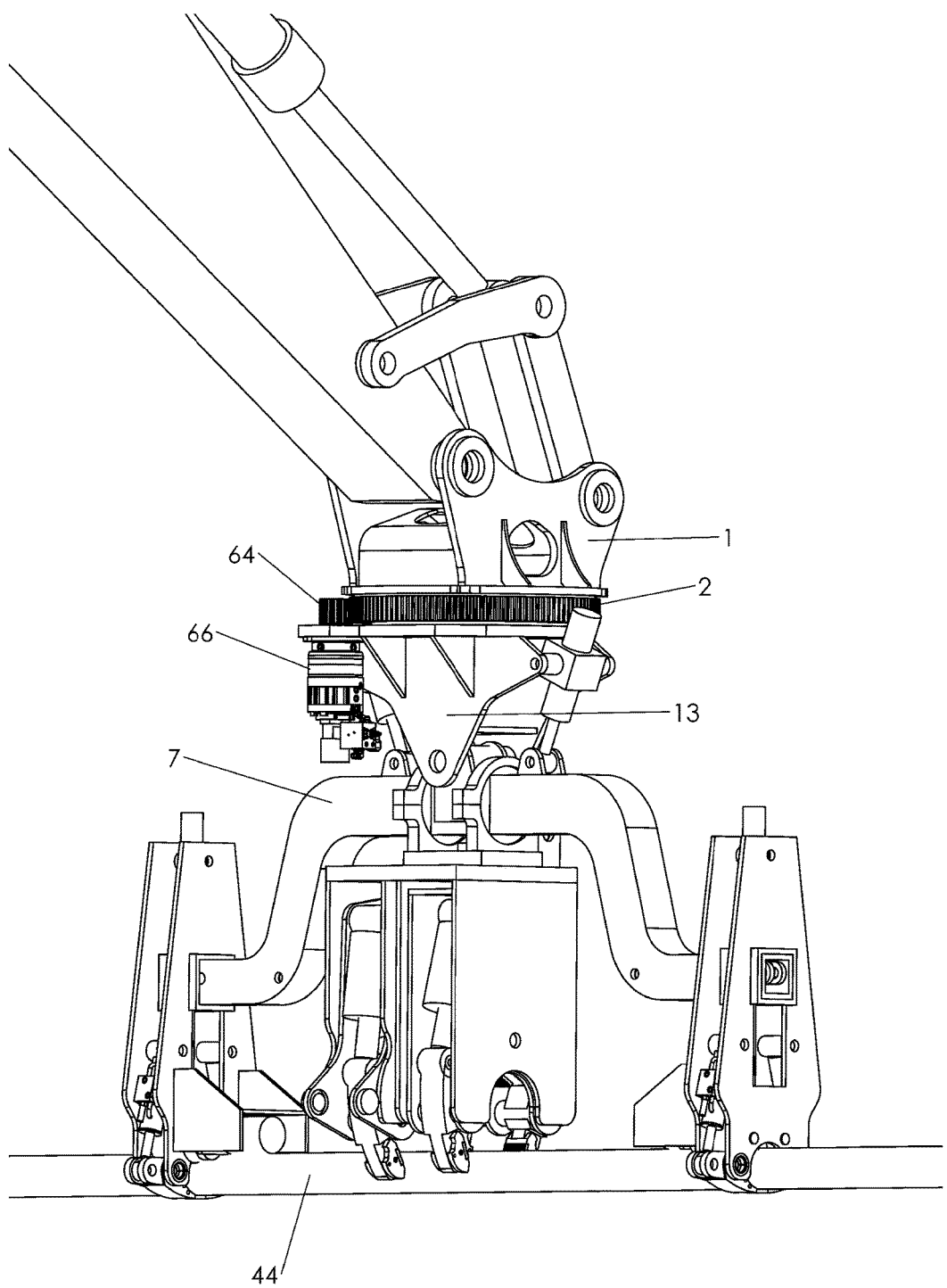
FIG. 3 is a view similar to FIG. 2 but from the rear side.
Figure 4:
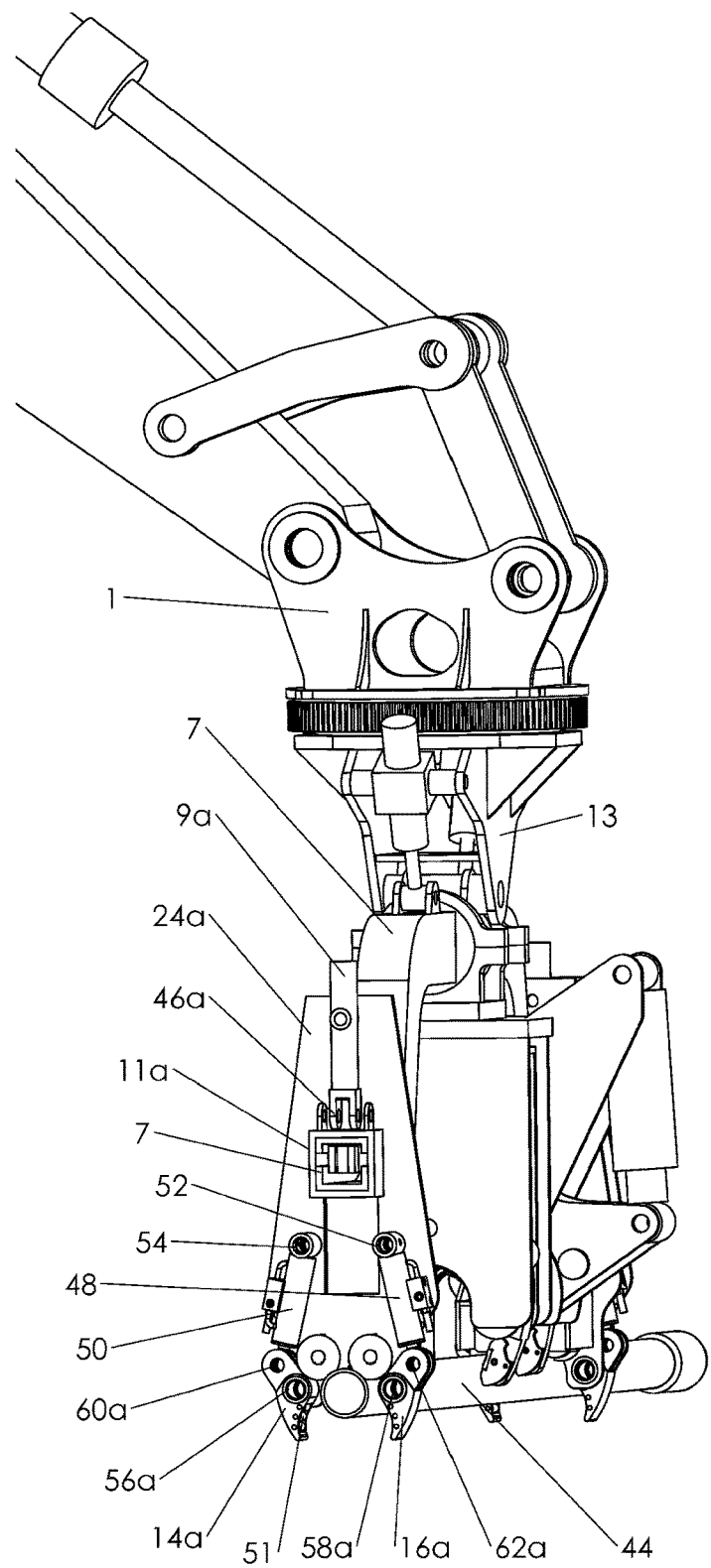
FIG. 4 illustrates the pipe handling attachment with portions of the pipe roller gripping assemblies removed to show interior components of the pipe roller gripping assemblies.
Figure 5:
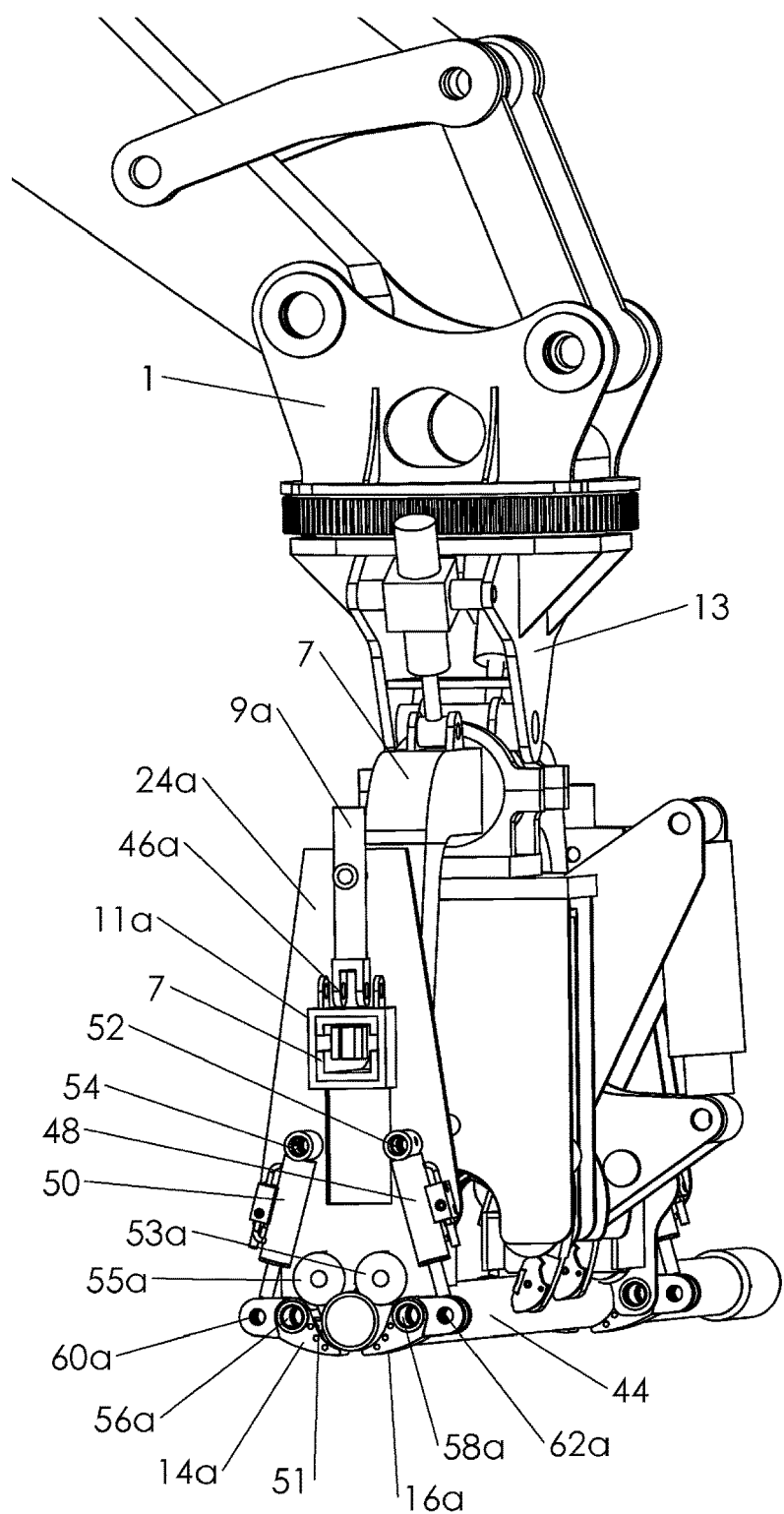
FIG. 5 is a view similar to FIG. 4 but with the pipe grabber arms of the pipe roller gripping assemblies closed to grip the pipe section.

With reference to FIG. 3, rotation of the lower head 13 is caused by a drive motor 66 mounted on the lower head. A pinion gear 64 that is driven by the drive motor 66 is engaged with the outer race, connected to the lower head, of the slew bearing 2 that has gear teeth that mesh with the pinion gear 64. When the pinion gear 64 is rotated in the desired direction by the drive motor 66, the lower head 13 rotates relative to the upper head 1 about the axis B. Preferably, the lower head 13 is able to rotate continuously 360 degrees in either direction.

Returning to FIGS. 1-3 and 6, a main beam 7 is pivotally connected to the lower head 13 by a pivot 5 to permit the main beam 7 to pivot relative to the lower head about axis C which is perpendicular to axis A and axis B. Tilt actuators 3a, 3b extend from the lower head 13 to connection points on the main beam 7. The tilt actuators 3a, 3b can be, for example, hydraulic, pneumatic, electrical or mechanical actuators that can extend and retract for pivoting the main beam 7 about the axis C relative to the lower head 13.

Further information on pipe handling attachments that are attachable to an excavator arm, and having a pivoting main beam, lower head, tilt actuators and other features, can be found in US 2009/0057019 and US 2010/0308609, which are incorporated herein by reference in their entireties.

Figure 2:
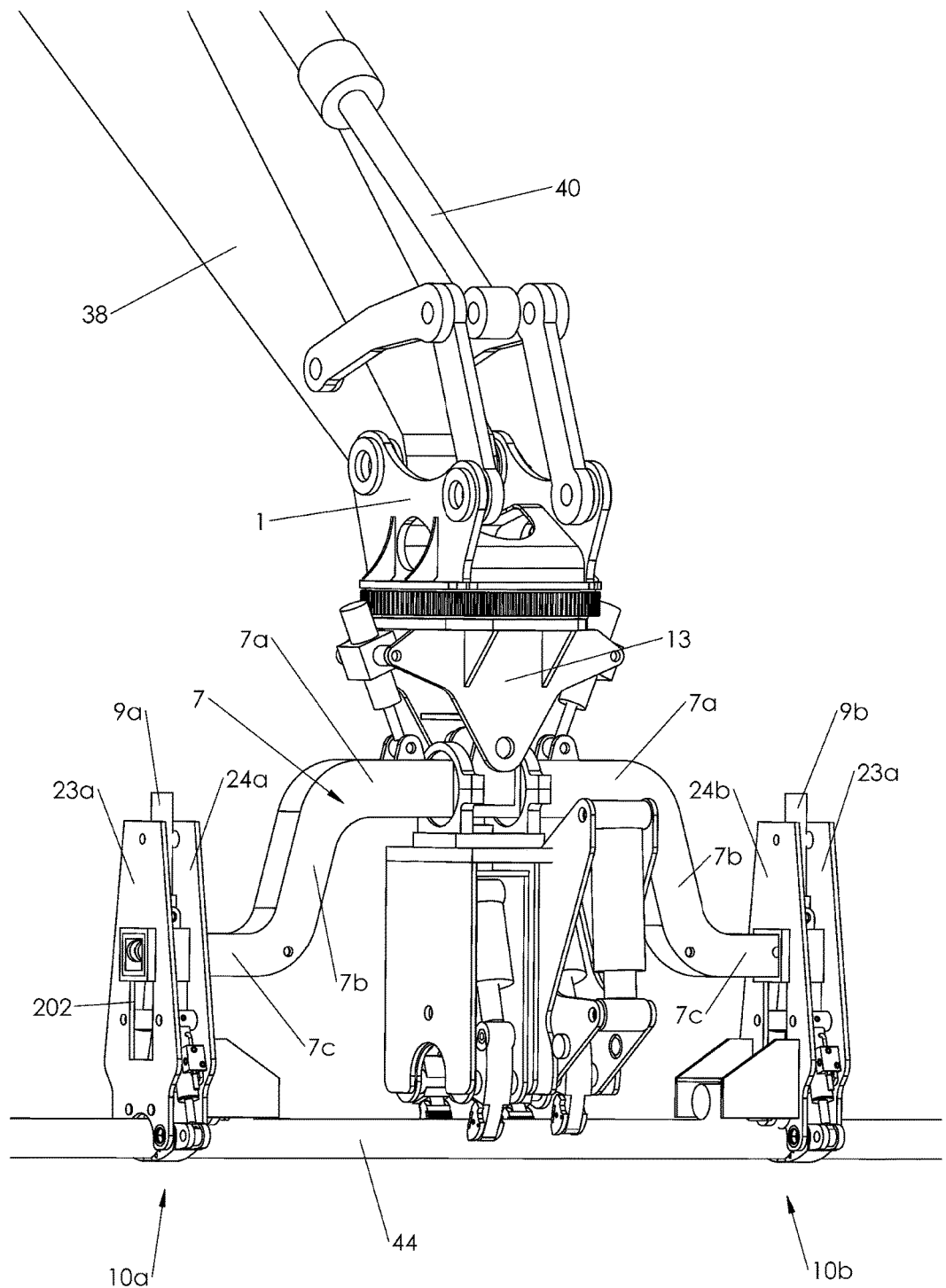
FIG. 2 is a perspective view of the pipe handling attachment with the pipe roller gripping assemblies gripping a section of pipe.

With reference to FIGS. 1-3, a pipe break mechanism 18 and pipe roller gripping assemblies 10a, 10b are mounted on the main beam 7 and tilt with the beam about axis C. As will be described further below, the pipe break mechanism 18 is configured to be disposed over the joint between two pipe sections, and configured to clamp one pipe section while clamping and rotating the second pipe section in order to either initiate breaking of the joint in the case of pipe break out or torqueing the joint between the two pipe sections to a predetermined torque value in the case of pipe make up. As will also be described further below, the pipe roller gripping assemblies 10a, 10b are configured to grip a single pipe section and rotate the pipe section to unthread the pipe section from another pipe section in the case of pipe break out or thread the pipe section onto another pipe section in the case of pipe make up. The pipe roller gripping assemblies 10a, 10b are also configured to securely grip a pipe section to enable the attachment 200 under the power of the prime mover to move the pipe section from one point to another and to pick up a pipe section, such as from a pipe stack or from the ground.

The pipe roller gripping assemblies 10a, 10b are identical in construction and are mounted on the main beam 7 so that each assembly 10a, 10b can slide axially (independently or in synchronization) on the main beam to adjust the positions of the assemblies 10a, 10b on the main beam 7. The assemblies 10a, 10b can also be put into a float mode as discussed further below. In addition, each pipe roller gripping assembly 10a, 10b is also mounted so as to be moveable (independently or in synchronization) in a direction perpendicular to the main beam 7.

The pipe break mechanism 18 is positioned approximately midway between the pipe roller gripping assemblies 10a, 10b. The pipe break mechanism 18 is mounted on the main beam 7 by a pillow block trunnion bearing 8. The trunnion bearing 8 allows the pipe break mechanism 18 to swing about the main beam 7 about an axis that is generally parallel to axis A as will be described below in FIGS. 13-15. The pipe break mechanism 18 is also rotatable about a central axis thereof generally parallel to axis B as will be described below in FIGS. 13-15.

With reference to FIG. 2, the main beam 7 includes sections that form a continuous beam including a first section 7a that is generally linear and extends generally parallel to axis A. Second sections 7b, 7b extend downwardly from the ends of the first section 7a. Third sections 7c, 7c extend outwardly from the second sections 7b. The third sections 7c are generally linear and extend generally parallel to the first section 7a. Because of the second sections 7b, the third sections 7c are spaced downwardly the first section 7a. This helps provide space for the pipe break mechanism 18 which is mounted to the first section 7a. The pipe roller gripping assemblies 10a, 10b are mounted to the third sections 7c.

Pipe Roller Gripping Assemblies 10a, 10b

The pipe roller gripping assemblies will now be described with reference to FIGS. 1-5 and 7-8. The assemblies 10a, 10b are identical in construction so only the assembly 10a will be described in detail. It is to be understood that the assembly 10b is identical in construction and operation, but mounted on the opposite third section 7c of the main beam 7.

Figure 7:
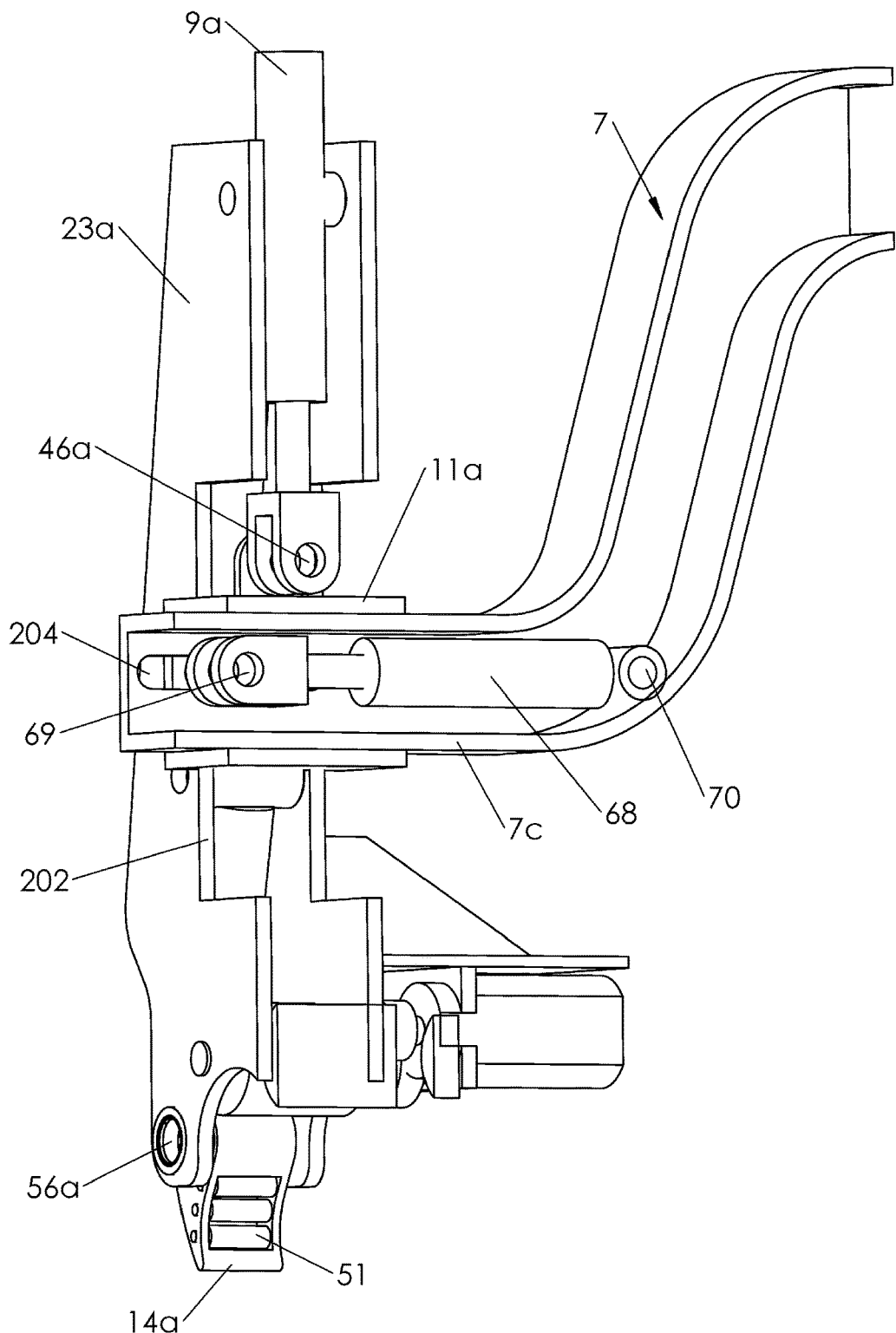
FIG. 7 is a partial sectional view of the area of one of the pipe roller gripping assemblies.

The assembly 10a includes first and second plates 23a, 24a that are arranged parallel to each other. The plates 23a, 24a each include a slot 202 formed therein. A follower sleeve 11a is slidably disposed on the third section 7c with the sleeve 11a being disposed in the slots 202 of the plates. As shown in FIG. 7, an actuator 9a, for example a hydraulic actuator, is disposed between the plates 23a, 24a. The upper end of the actuator 9a is fixed to the plates 23a, 24a and the end 46a of the actuating rod of the actuator 9a is fixed to the follower sleeve 11a. When the actuator 9a is actuated to extend or retract the actuating rod thereof, the plates 23a, 24a are caused to move up and down relative to the main beam 7 via the slots 202. This raises and lowers the assembly 10a relative to the main beam 7. It is preferred that the assemblies 10a, 10b can be lowered a sufficient distance below the pipe break mechanism 18 to permit the assemblies 10a, 10b to be able to pick up pipe 44 without the pipe break mechanism 18 contacting the pipe as shown in FIG. 2.

With continued reference to FIG. 7, it can be seen that main beam 7 is substantially hollow at least at the third sections 7c. An actuator 68, for example a hydraulic actuator, is disposed within the third section, and has one end 70 fixed to the main beam. The end 69 of the actuating rod of the actuator 68 is fixed to the follower sleeve 11a by a pin that extends through a slot 204 formed in one side of the third section 7c. When the actuator 68 is actuated to extend or retract the actuating rod thereof, the follower sleeve 11a is caused to move axially relative to the main beam 7 via the slot 204. This causes the assembly 10a to shift position axially on the main beam.

Below the main beam 7, pipe grabber arms 14a, 16a are pivotally mounted between the plates 23a, 24a at pivots 56a, 58a. The grabber arms 14a, 16a face each other and are actuatable between an open position shown in FIGS. 1 and 4 and a closed position shown in FIGS. 2, 3, and 5 for gripping a pipe. As shown in FIGS. 1-5, an actuator 48, 50, for example a hydraulic actuator, is connected to each of the grabber arms 14a, 16a for actuating the grabber arms between the open and closed positions. One end 52, 54 of each actuator is connected between the plates 23a, 24a, and ends 60a, 62a of the actuating rods of the actuators 48, 50 are fixed to the grabber anus. When the actuators 48, 50 are actuated to extend or retract the actuating rods thereof, the grabber arms are caused to pivot about the pivots 56a, 58a between the open and closed positions.

Figure 8:
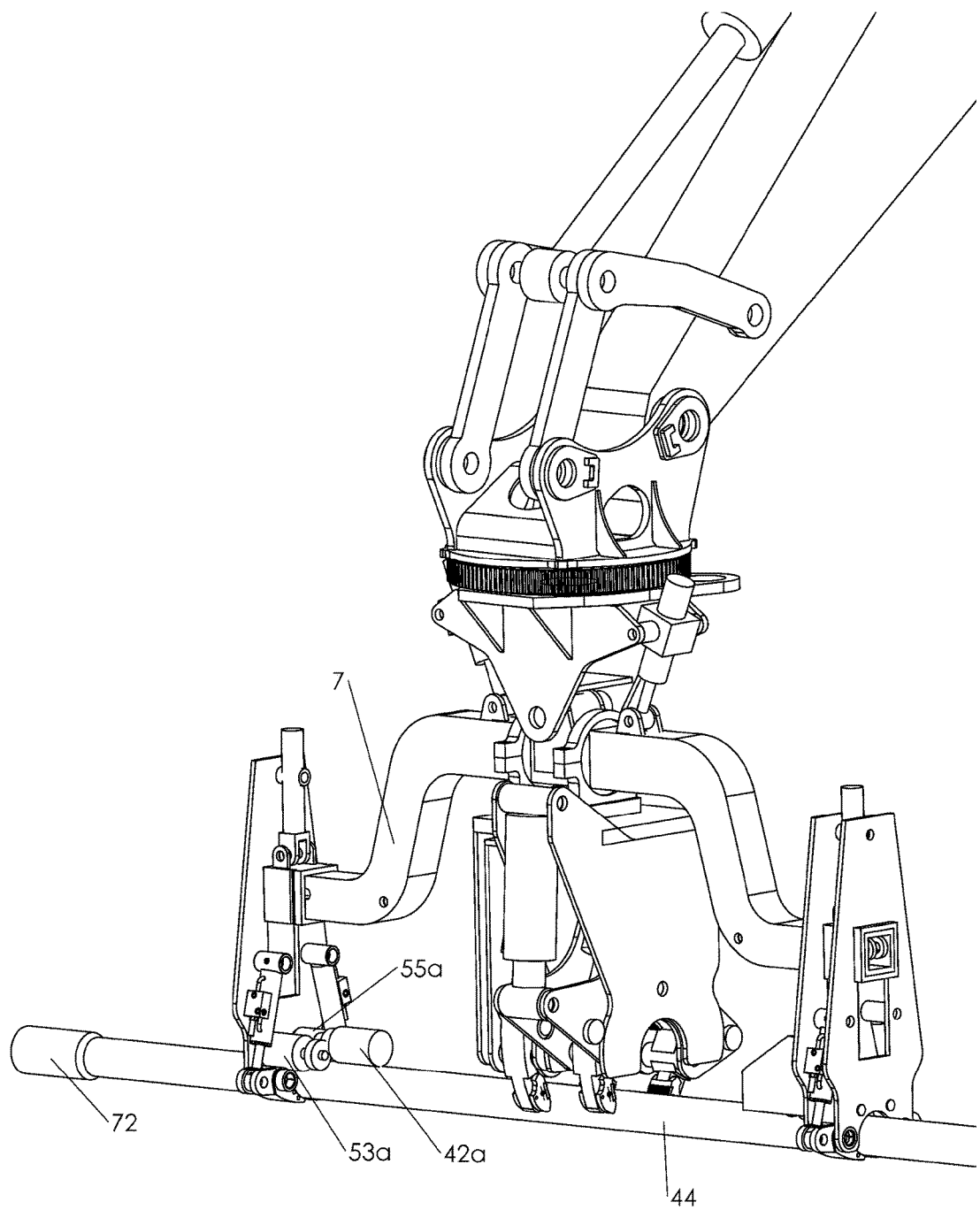
FIG. 8 shows a portion of one of the pipe roller gripping assemblies removed to show actuation of the pipe rollers.

As best seen in FIG. 7, a plurality of idler rollers 51 are mounted on each grabber arm 14a, 16a. The idler rollers 51 allow a section of pipe 44 that is grabbed by the grabber arms (see FIGS. 2, 3 and 5) to rotate relative to the grabber arms. Rotation of the pipe 44 is caused by a pipe drive mechanism disposed on each pipe roller gripping assembly. In particular, with reference to FIG. 5, two pipe drive rollers 53a, 55a are rotatably mounted between the plates 23a, 24a at a location above the pipe 44. When the pipe is grabbed by the grabber arms, the pipe drive rollers 53a, 55a are engaged with the upper surface of the pipe 44. With reference to FIG. 8, a pipe rotator motor 42a, for example a hydraulic or electric motor, is in driving engagement with each of the pipe drive rollers 53a, 55a to cause rotation of the drive rollers. The pipe rotator motor 42a is a reversible motor to permit rotation of the drive rollers 53a, 55a in each direction.

Any form of drive connection between the drive rollers and the pipe rotator motor 42a can be used. For example, a pinion gear on the rotator motor shaft can engage a gear on one of the drive rollers 55a, with a drive train, for example a belt or gear system, provided between the drive rollers.

When the pipe drive rollers 53a, 55a are rotated, the engagement between the drive rollers and the pipe 44 causes the pipe 44 to rotate about its longitudinal axis. Because of the idler rollers 51, the pipe 44 rotates relative to the grab arms. The rollers 53a, 55a can be formed from high friction rubber and/or can be provided with other friction enhancing features to increase the friction between the rollers and the pipe surface.

The operation of the pipe roller gripping assemblies will now be described. The operation will be discussed relative to one exemplary make up operation where a section of pipe is unloaded from a pile of pipe, the pipe is threaded onto a section of pipe at the tail end of a pipe string, and then the gripping assemblies are repositioned for the operation to torque the joint to the proper torque value. It is to be realized that the reverse order of operation can be used during a pipe break out operation where after the joint is initially broken, the pipe roller gripping assemblies unthread the pipe section and then stack the pipe section in a pipe rack.

With reference to FIGS. 1-3, the gripping assemblies 10a, 10b are in their vertically lowermost position relative to the main beam 7 with the main beam adjacent to upper ends of the slots 202. In addition, the grabber arms 14a, 16a are in their open position. The attachment 200 is then lowered toward the pile of pipe using the boom arm 38 in order to pick up the section of pipe to be threaded onto the pipe string. The orientation of the main beam 7 relative to the pipe 44 can be adjusted, if necessary, via the various adjustment capabilities of the attachment 200 discussed above in FIGS. 1-3, including using the prime mover actuator 40 to tilt the attachment 200 about axis A, using the drive motor 66 to rotate the lower head 13 about axis B, and using the tilt actuators 3a, 3b to tilt the main beam about the axis C.

Once the main beam 7 is correctly aligned with the pipe 44, the attachment 200 is lowered further toward the pipe. Once the pipe 44 is positioned in the area between the grabber arms and the pipe drive rollers with the pipe drive rollers firmly positioned tangent to the pipe 44, the grabber arms are actuated to the closed position as shown in FIG. 2.

Figure 6:
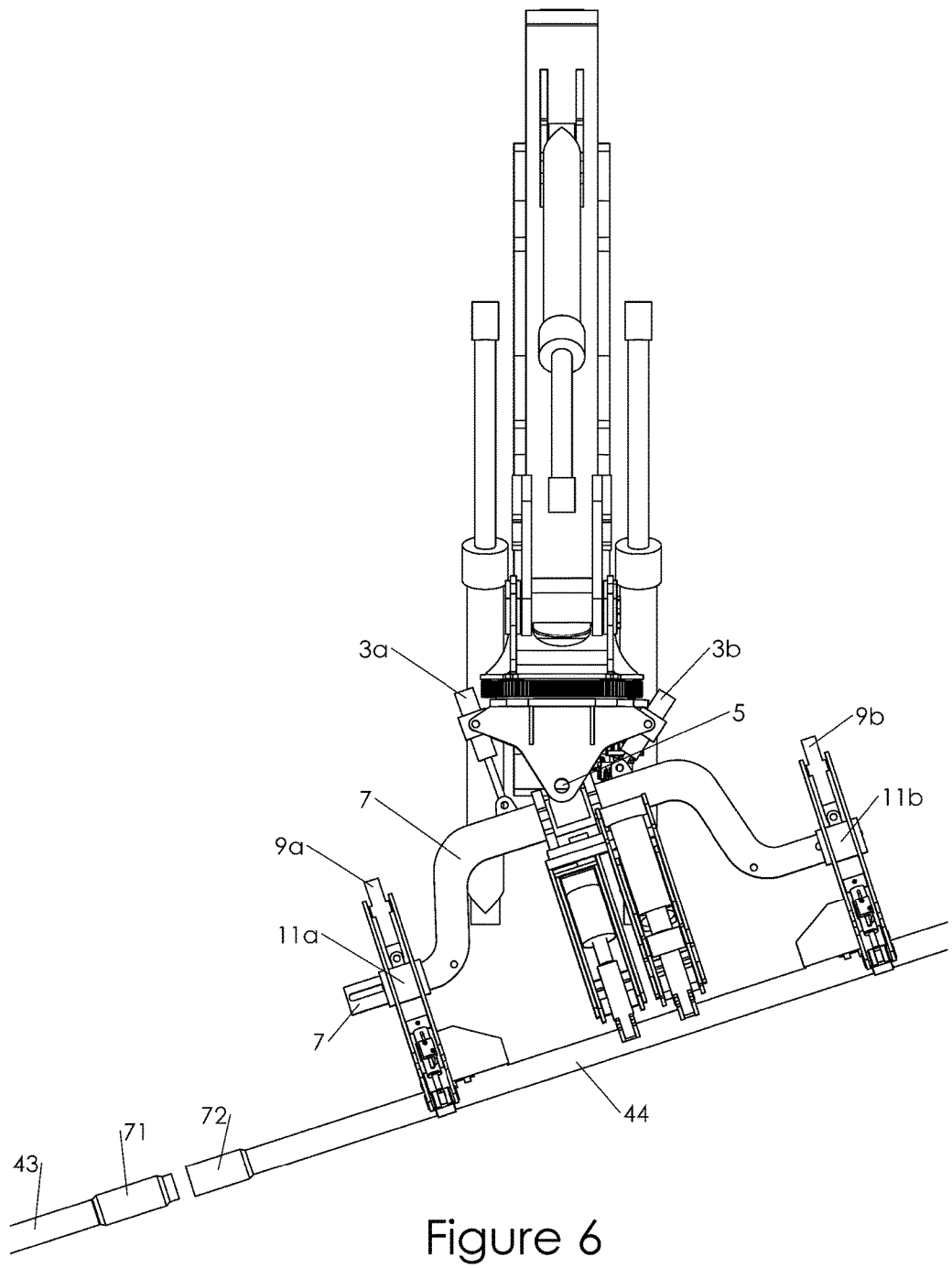
FIG. 6 illustrates the pipe handling attachment holding a pipe section at an angle prior to threading onto another pipe section at the tail end of a pipe string.

Referring to FIG. 6, once the pipe 44 is secured in the pipe grabber arms, the pipe 44 is picked up. The gripping assemblies 10a, 10b are shifted left or right on the main beam 7 in order to permit axial shifting of the gripping assemblies 10a, 10b during the threading operation. FIG. 6 shows each of the gripping assemblies 10a, 10b axially shifted to the right on the main beam 7 to permit the gripping assemblies to be axially shifted to the left on the main beam as discussed below.

With continued reference to FIG. 6, the pipe 44 is then carried by the attachment 200 to a position adjacent a tool joint 71 of a pipe 43 that is sticking out of the ground and to which a tool joint 72 of the pipe 44 will be connected. The prime mover operator then uses the various adjustment capabilities of the attachment to align the tool joint 72 of the pipe 44 to the tool joint 71 of the pipe 43. It is expected that the operator would typically position the tool joints of the pipes to, for example, approximately one inch apart using the prime mover.

Figure 9:
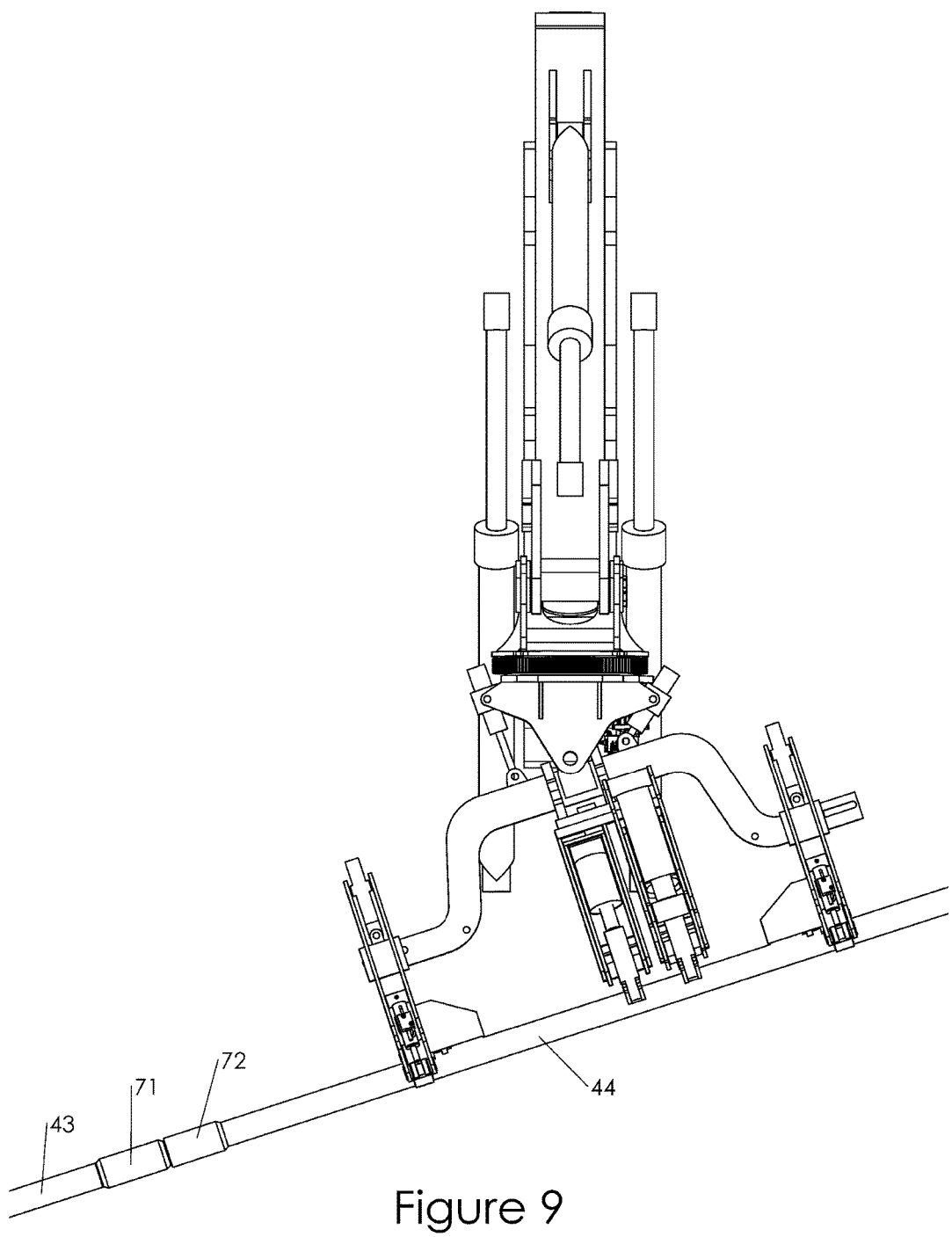
FIG. 9 shows the pipe handling attachment threading the pipe section onto the tail end of the pipe string.

Once the tool joints 71, 72 are aligned, the gripping assemblies 10a, 10b are then axially shifted to the left in FIG. 6 until the threads on the tool joints 71, 72 just engage to permit threading. With reference to FIG. 9, once the tool joints 71, 72 are touching, the pipe rotator motors are started which rotate the pipe drive rollers thereby rotating the pipe 44 about its longitudinal axis. This threads the tool joint 72 of the pipe 44 onto the tool joint 71 of the pipe 43 until the threads are fully seated as shown in FIG. 9. The pipe grabber arms are then opened and the gripping assemblies 10a 10b are raised upward relative to the main beam 7 to the position shown in FIG. 10 to prevent their interfering with subsequent operation of the pipe break mechanism 18.

During threading and unthreading, the threads on the tool joints will tend to cause one or both of the pipes 43, 44 to move axially toward each other. Typically, in a long pipe string, the pipe 43 will not be able to move axially in which case the pipe 44 must be allowed some axial movement. Since the pipe 44 is securely gripped by the assemblies 10a, 10b, axial movement of the pipe 44 relative to the assemblies 10a, 10b is not permitted. Instead, it is believed that the boom arms 38 on many prime movers, such as excavators, have enough play in them to permit the boom arm 38 to move in a direction to allow the pipe 44 to move axially toward the pipe 43. In the event that the boom arm 38 does not have any or a sufficient amount of play, another means of accommodating the axial movement will need to be provided.

For example, as discussed above in FIG. 7, the gripping assemblies 10a, 10b can shift axially using the cylinder 68. During threading or unthreading when axial shifting of the pipe 44 is required, the cylinders 68 of the assemblies 10a, 10b can be put into a floating mode allowing free axial shifting of the assemblies 10a, 10b on the main beam 7. This will permit the axial shifting of the pipe 44 during threading and unthreading. Once threading or unthreading is complete, the cylinders 68 can be locked to maintain the axial positions of the assemblies 10a, 10b.

The prime mover then lifts the attachment 200 off of the pipe 44. The pipe 44 is now self-supporting since it is now threaded onto the pipe 43. The pipe break mechanism 18 is then used to torque the joint between the pipes 43, 44 and complete the threading of the pipe 44 onto the pipe 43.

The gripping of the pipe 44 by the assemblies 10a, 10b is sufficient to securely hold the pipe 44 at all angles, including holding the pipe 44 vertically for connection to a vertical pipe that is extending out of the ground.

Pipe Break Mechanism 18

The pipe break mechanism will now be described with reference to FIGS. 1 and 10-12. The pipe break mechanism 18 is used to torque the tool joint 71, 72 between the pipes 43, 44 to a predetermined torque value and finish connecting the pipes 43, 44, or to initiate breaking of the tool joints between two pipes by applying a high torque to break the joint.

The pipe break mechanism 18 includes a stationary vise section 210 and a break out vise section 212. The stationary vise section 210 is configured to clamp onto and hold the tool joint 71 on one side of the joint, while the break out vise section 212 is configured to clamp onto the tool joint 72 of the pipe 44 on the other side of the joint and rotate the pipe 44 relative to the pipe 43.

It is to be understood that the stationary vise section 210 could instead be the break out vise section, and the break out vise section 212 could instead be the stationary vise section. In addition, it is to be understood that the stationary vise section 210 could also be configured as a break out vise section 212 so that the pipe break mechanism 18 includes two break out vise sections, with the break out vise sections being configured to permit one of them to be selectively fixed so as to function as the stationary vise section.

Figure 11:
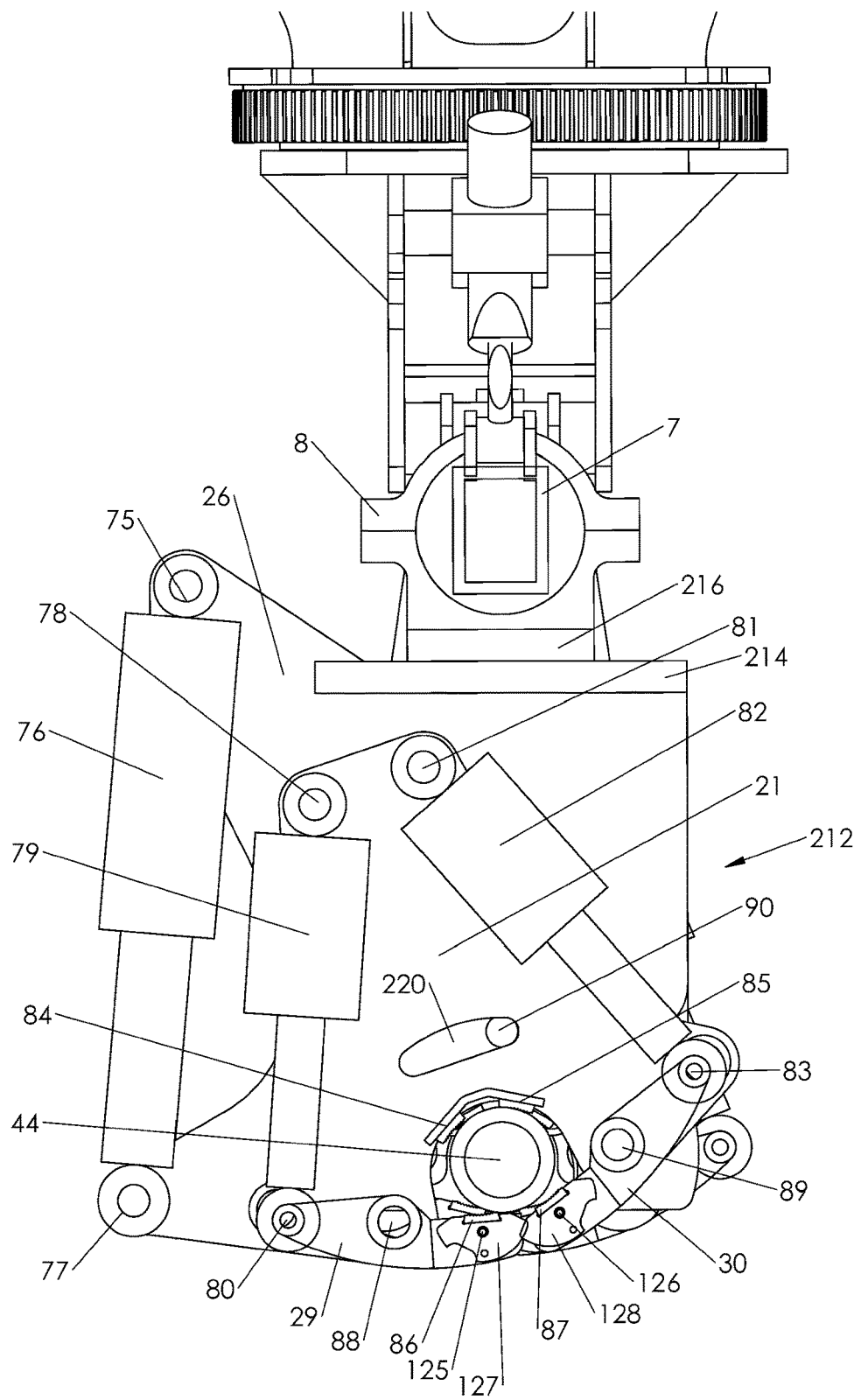
FIG. 11 is a detailed view of the interior of the break out vise section of the pipe break mechanism.
Figure 12:
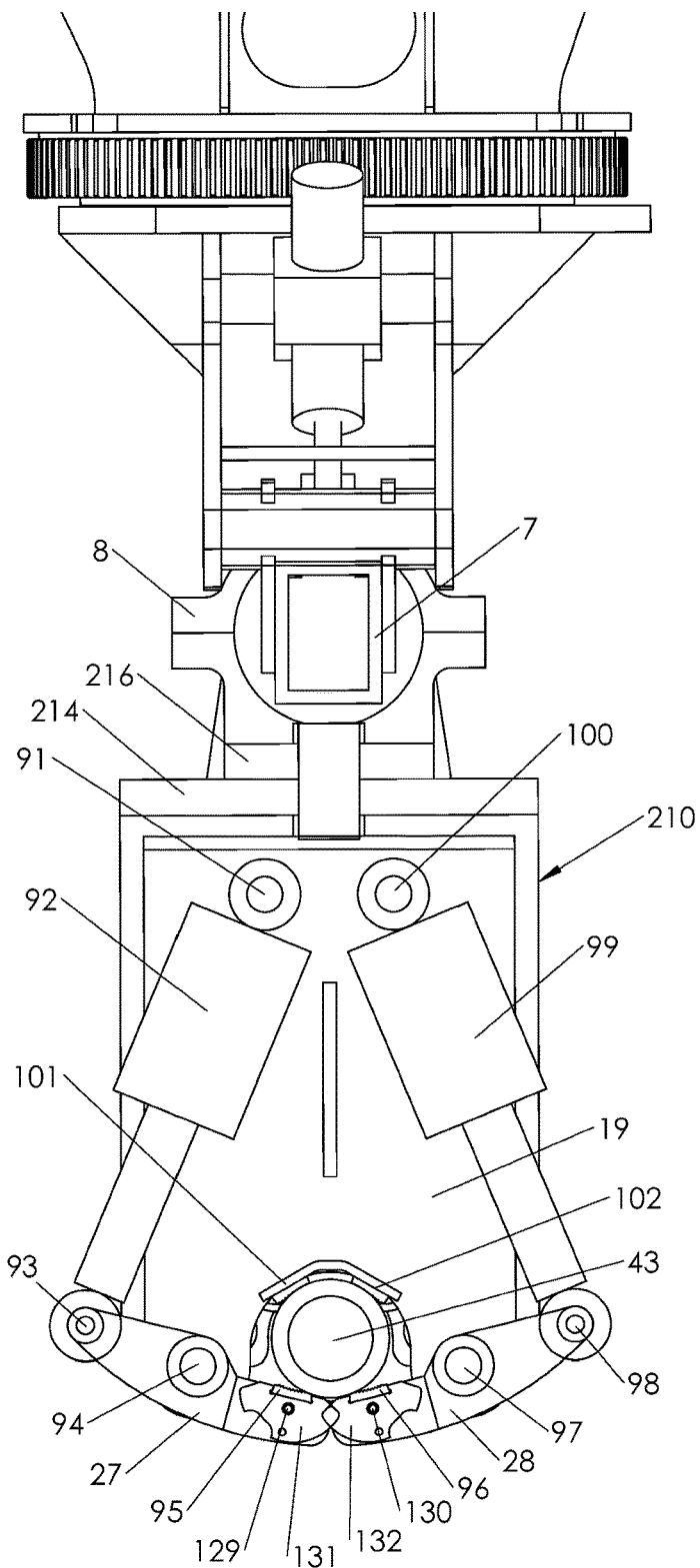
FIG. 12 is a detailed view of the interior of the stationary vise section of the pipe break mechanism.

The pipe break mechanism 18 is configured generally similar to a box. With reference to FIGS. 11 and 12, a top plate 214 of the pipe break mechanism 18 is rotatable relative to a plate 216 that is fixed to the lower end of the trunnion bearing 8. An actuator is mounted on the plate 216 and is connected to the top plate 214 for rotating the pipe break mechanism 18 about an axis that in FIG. 1 is parallel to axis B. In addition, the trunnion bearing 8 permits the pipe break mechanism 18 to pivot about the main beam 7 about an axis that is parallel to the axis A.

The stationary vise section 210 includes a pair of spaced side plates 19, 20. With reference to FIG. 12 in which the plate 20 (shown in FIG. 1) is removed for clarity, a pair of opposing vice jaw assemblies 27, 28 are pivotally mounted between the plates 19, 20 by pivots 94, 97 for pivoting movement between an open position (FIG. 1) and a closed, clamping position (FIG. 12). Vice jaws 95, 96, also known as tong dies, are mounted to the inward facing ends of the jaw assemblies 27, 28. The vice jaws 95, 96 are held in rotatable holders 131, 132 that are rotatably mounted on pivots 129, 130 that mount the holders to the vice jaw assemblies 27, 28. The holders 131, 132 are rotatable to a limited extent about the pivots 129, 130 to allow the vice jaws 95, 96 to align with the surface of the pipe 43 to a position substantially tangent to the pipe causing the contact surface of the vice jaws 95, 96 to contact the pipe 43 directly.

The vice jaws 95, 96 are wear items and are preferably mounted to permit their removal and replacement as they wear. In addition, the vice jaws 95, 96 are provided with knurls, teeth, serrations or other means to increase the grip between the vice jaws and the outer surface of the pipe to which the vise section 210 clamps.

Vice jaws 101, 102, also known as tong dies, are also secured to upper inside surfaces of the plates 19, 20 facing toward a pipe receiving area of the vise section 210. The vice jaws 101, 102 are each engageable with the top outer surface of the pipe to which the vise section clamps. The vice jaws 101, 102 can either be fixed in position or, like the vice jaws 95, 96, be pivotably mounted to allow the vice jaws 101, 102 to align with the surface of the pipe. The vice jaws 101, 102 are also wear items and are preferably mounted to permit their removal and replacement as they wear. In addition, the vice jaws 101, 102 are provided with knurls, teeth, serrations or other means to increase the grip between the vice jaws and the outer surface of the pipe to which the vise section 210 clamps.

The jaw assemblies 27, 28 are actuated between the open and closed positions by actuators 92, 99 connected at one end 93, 98 thereof to the jaw assemblies, and at opposite ends 91, 100 to the side plates 19, 20. The actuators 92, 99 can be, for example, hydraulic or pneumatic actuators.

Figure 17:
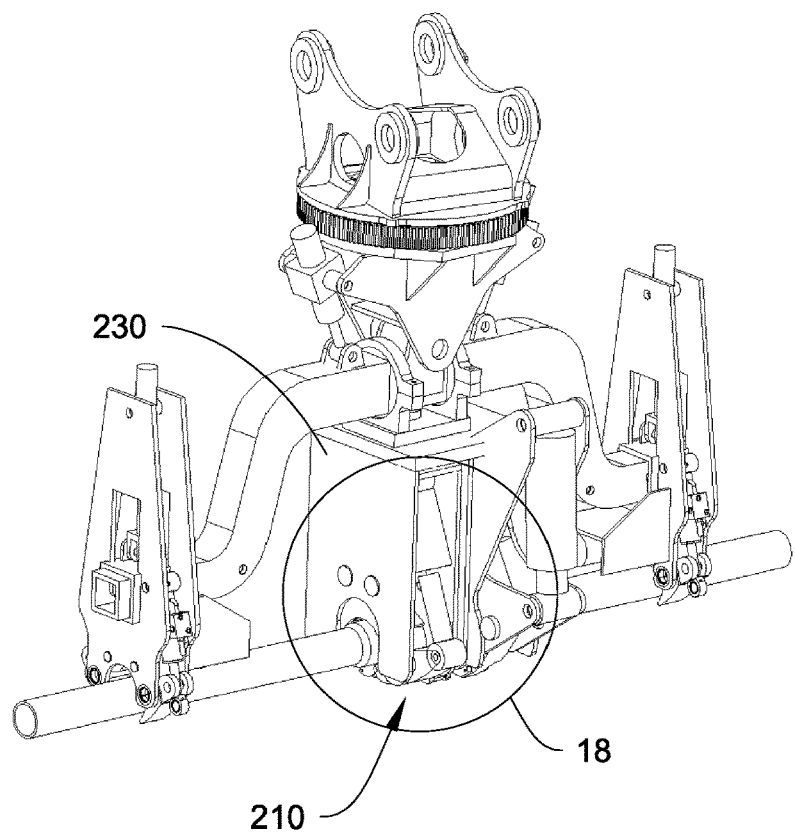
FIG. 17 is a view similar to FIG. 1 to help explain floating of the stationary vise section.
Figure 18:
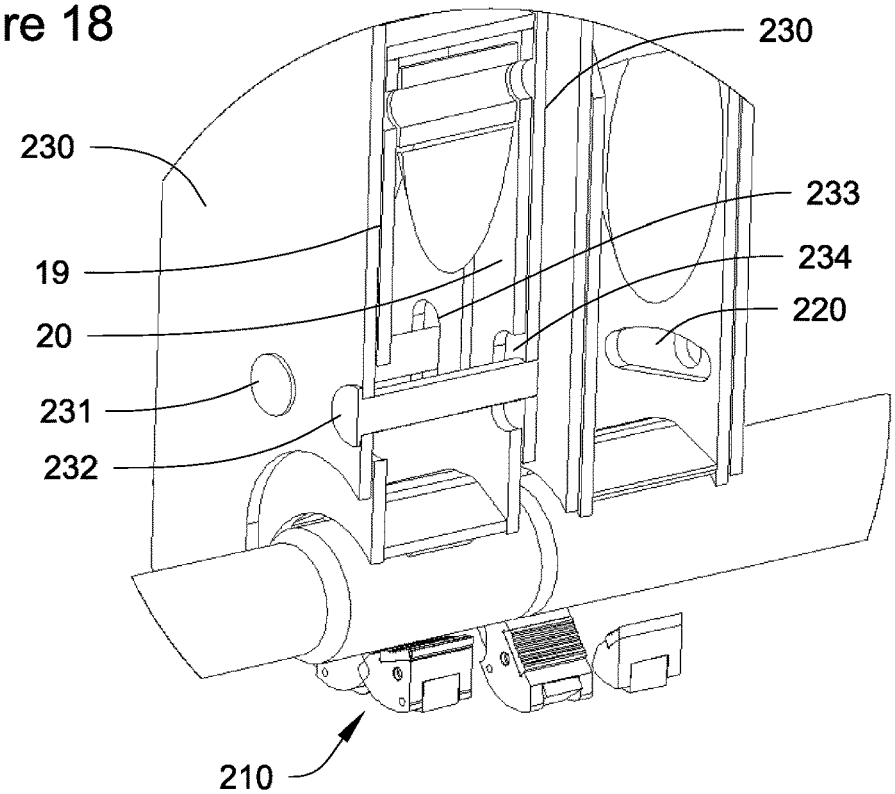
FIG. 18 is a detailed view of the portion contained in the circle 18 of FIG. 17.

With reference to FIGS. 17 and 18, one of the vise sections 210, 212 is allowed to float to accommodate differences in diameters of the pipe adjacent to the joint. In the illustrated embodiment, it is the stationary vise section 210 that is configured to float. However, it is possible to configure the break out vise section 212 to float.

As shown in FIGS. 17 and 18, side plates 230 are positioned outside of and facing the side plates 19, 20. The upper ends of the side plates 230 are fixed to the top plate 214. The stationary vise section 210, including the side plates 19, 20 and the vice jaw assemblies 27, 28, is slidable vertically up and down relative to the side plates 230. For example, each side plate 19, 20 includes an elongated, vertical slot 233, 234 (only the slots in the side plate 20 are visible; the slots in the side plate 19 are positioned directly opposite the slots in the side plate 20). A pair of pins 231, 232 are fixed at each end to the plates 230 and extend through the slots 233, 234 to guide the plates 19, 20 as they slide up and down.

This exemplary described floating mounting of the stationary vise section 210 permits the stationary vise section 210 to float up or down so that the vice jaw assemblies 27, 28 can accommodate differences in pipe joint diameters. For example, for a relatively larger diameter pipe, the stationary vise section 210 can float upward to accommodate the larger diameter. For a relatively smaller diameter pipe, the stationary vise section 210 can float downward to accommodate the smaller diameter. The amount of float provided to the stationary vise section 210 can be selected by the user based on expected variation in pipe diameter that needs to be accommodated.

As shown in FIG. 12, the stationary vise section 210 is configured to clamp the tool joint 71 of the pipe 43 on one side of the joint. When clamped, the stationary vise section 210 holds the pipe 43 stationary relative to the pipe 44 that is clamped by the break out vise section 212 to prevent the pipe 43 from rotating.

Figure 10:
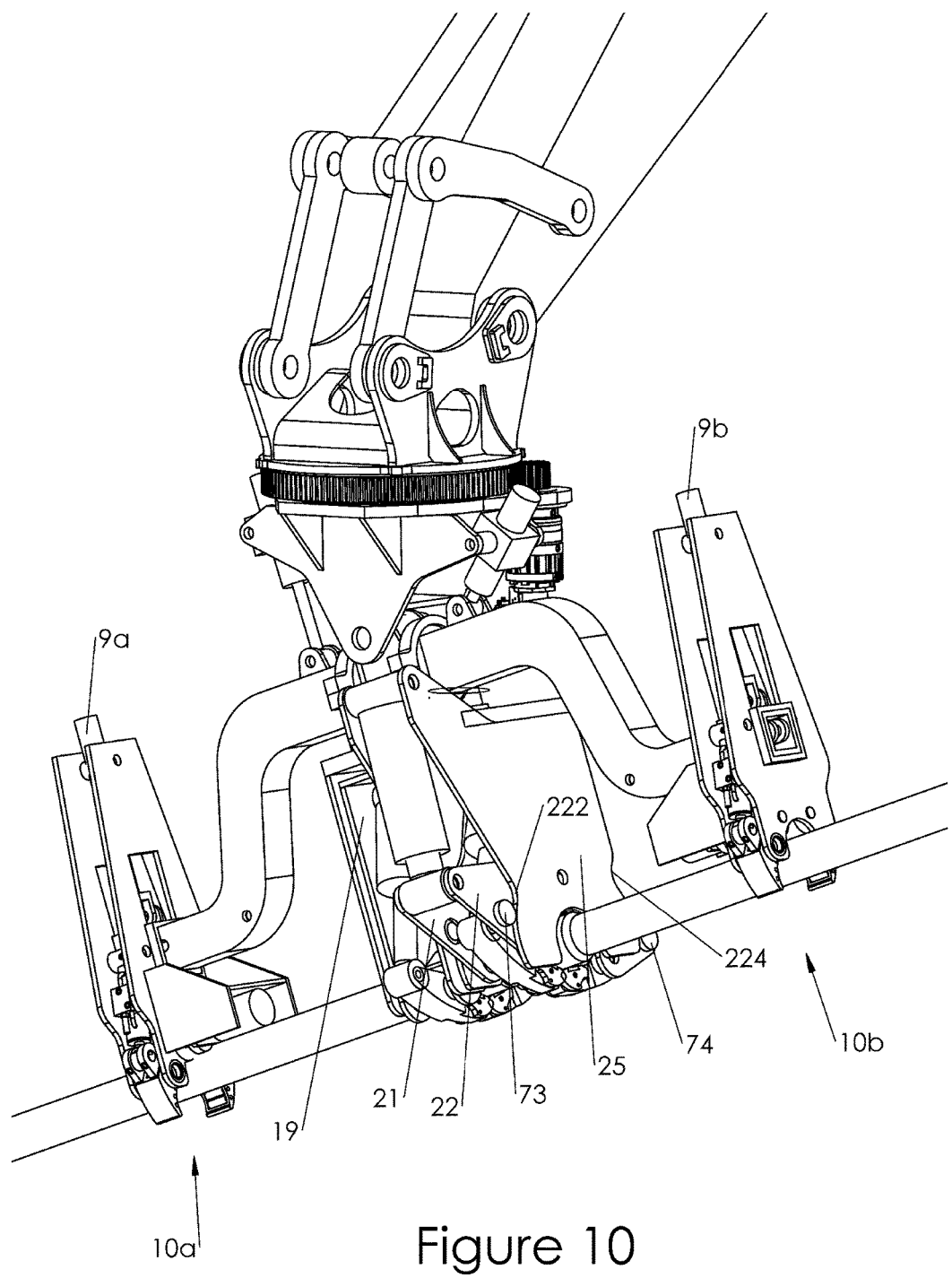
FIG. 10 shows the pipe handling attachment with the pipe break mechanism positioned over the joint between the two pipe sections in order to complete connection of the pipe sections.

With reference to FIGS. 10 and 11, the break out vise section 212 includes a pair of spaced main housing plates 25, 26, and a pair of moveable, spaced side plates 21, 22. The plates 25, 26 are connected to the top plate 214. In addition, the side plates 21, 22 are mounted so as to be pivotable relative to the main plates 25, 26.

A pair of opposing vice jaw assemblies 29, 30 are pivotally mounted between the movable plates 21, 22 by pivots 88, 89 for pivoting movement between an open position (FIG. 1) and a closed, clamping position (FIGS. 10 and 11).

Vice jaws 86, 87, also known as tong dies, are mounted to the inward facing ends of the jaw assemblies 29, 30. The vice jaws 86, 87 are held in rotatable holders 127, 128 that are rotatably mounted on pivots 125, 126 that mount the holders to the vice jaw assemblies 29, 30. The holders 127, 128 are rotatable to a limited extent about the pivots 125, 126 to allow the vice jaws 86, 87 to align with the surface of the pipe 44 to a position substantially tangent to the pipe causing the contact surface of the vice jaws 86, 87 to contact the pipe 44 directly.

The vice jaws 86, 87 are wear items and are preferably mounted to permit their removal and replacement as they wear. In addition, the vice jaws 86, 87 are provided with knurls, teeth, serrations or other means to increase the grip between the pads and the outer surface of the pipe to which the vise section 212 clamps.

Vice jaws 84, 85, also known as tong dies, are also secured to upper inside surfaces of the plates 21, 22 facing toward a pipe receiving area of the vise section 212. The vice jaws 84, 85 are each engageable with the top outer surface of the pipe to which the vise section clamps. The vice jaws 84, 85 can either be fixed in position or, like the vice jaws 86, 87, be pivotably mounted to allow the vice jaws 84, 85 to align with the surface of the pipe. The vice jaws 84, 85 are also wear items and are preferably mounted to permit their removal and replacement as they wear. In addition, the vice jaws 84, 85 are provided with knurls, teeth, serrations or other means to increase the grip between the vice jaws and the outer surface of the pipe to which the vise section 212 clamps.

The jaw assemblies 29, 30 are actuated between the open and closed positions by actuators 79, 82 connected at one end 80, 83 thereof to the jaw assemblies, and at opposite ends 78, 81 to the side plates 21, 22. The actuators 79, 82 can be, for example, hydraulic or pneumatic actuators.

In addition, a breaking actuator 76 is fixed at one end 75 to the main plates 25, 26 and fixed at its opposite end 77 to flanges extending from the plates 21, 22. The breaking actuator 76, which can be, for example, a hydraulic or pneumatic cylinder, is used to rotate the side plates 21, 22 relative to the main plates 25, 26 once the pipe 44 is clamped between the jaw assemblies 29, 30 and the vice pads 84, 85 as shown in FIG. 11. This causes the pipe 44 to rotate about its longitudinal axis relative to the pipe 43 that is clamped by the stationary vise section 210 to torque the tool joints in the case of pipe make up or to break the joint in the case of pipe break out.

Fixing the side plates 21, 22 to the main plates 25, 26 and permitting rotation of the side plates relative to the main plates is provided by a guide pin 90 fixed to and extending between the main plates 25, 26 that is disposed with slots 220 formed in the side plates 21, 22, as shown in FIG. 11 (the slot 220 in the side plate 22 is not visible in the Figures). In addition, as shown in FIGS. 1 and 10, the side plates 21, 22 include guide pins 73, 74 that ride on contoured edges 222, 224, respectively, of the main plates 25, 26. The guide pins 73, 74 guide the side plates 21, 22 as they move relative to the main plates.

The operation of the pipe break mechanism 18 will now be described. The operation will be discussed relative to the pipe make up operation discussed above for the pipe roller gripping assemblies 10a, 10b where the pipe break mechanism is used to torque the tool joints to complete the connection between the pipes 43, 44. It is to be realized that the reverse order of operation can be used during a pipe break out operation where the pipe break mechanism 18 is used to initially break the joint by applying a large torque, followed by use of the pipe roller gripping assemblies to unthread the pipe section and then stack the pipe section in a pipe rack.

Once the assemblies 10a, 10b have completed threading the tool joint 72 of the pipe 44 onto the tool joint 71 of the pipe 43, the prime mover lifts the attachment 200 off of the pipe 44. The attachment 200 is then moved to position the pipe break mechanism 18 near the tool joints 71, 72 of the pipes 43, 44, with the stationary vise section 210 position over the tool joint 71 and the break out vise section 212 positioned over the tool joint 72 of the pipe 44. During this time, the vice jaw assemblies 27, 28, 29, 30 are all actuated to the open position as shown in FIG. 1 so as to be able to receive the tool joints of the pipes 43, 44 therethrough. The pipe break mechanism 18 is then lowered onto the tool joints 71, 72 by lowering the attachment using the prime mover, for example an excavator.

Once in position, the vice jaw assemblies are actuated to the closed, clamping position to clamp the tool joints of the pipes. The vice jaws on the vice jaw assemblies and the vice jaws on the side plates help to securely clamp the tool joints. Once the tool joints are clamped, the side plates 21, 22 are rotated about the axis of the pipe 44 by either extending or retracting the actuator 76. Since the stationary vise section 210 clamps the tool joint of the pipe 43, and the tool joint of the pipe 44 is clamped by the break out vise section 212, the pipe 44 is rotated relative to the pipe 43 to finish torquing the tool joint 72 into the tool joint 71 to a predetermined torque value.

As indicated above, if the two pipes 43, 44 are to be disconnected, a reverse operation is employed to use the pipe break mechanism 18 to break the joint between the two pipes, followed by use of the pipe roller gripping assemblies to finish unthreading the pipe 44 from the pipe 43.

As indicated above, the pipe break mechanism 18 is rotatable about an axis that in FIG. 1 is parallel to axis B, as well as pivotable about the main beam 7 about an axis that is parallel to the axis A. This movement of the pipe break mechanism 18 permits the pipe break mechanism 18 to be moved in order to negotiate around a large pipe accessory known as a reamer or hole opener 110.

Figure 13:
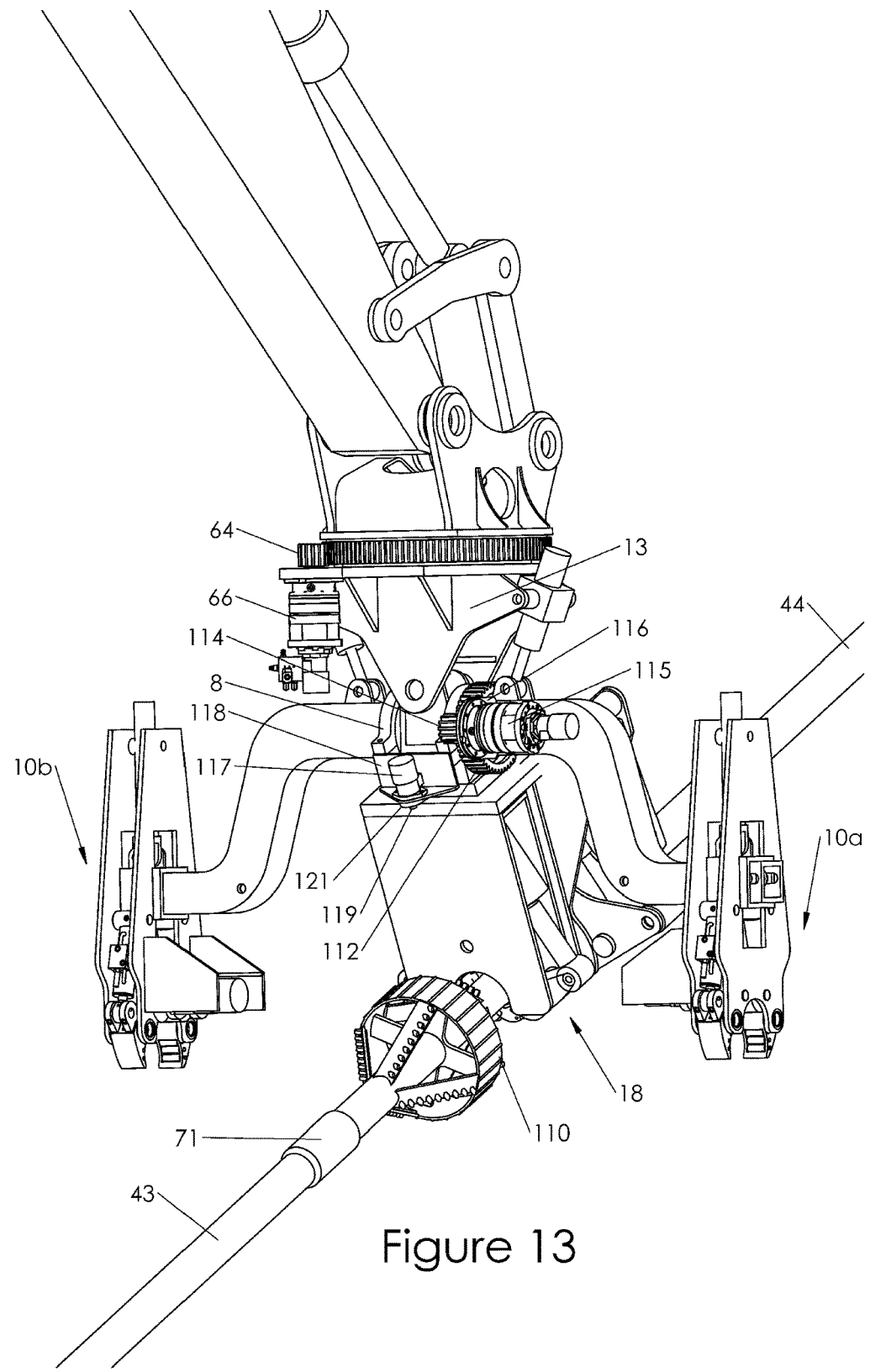
FIG. 13 illustrates the pipe break mechanism positioned relative to a reamer to break out a pipe section from the reamer.
Figure 14:
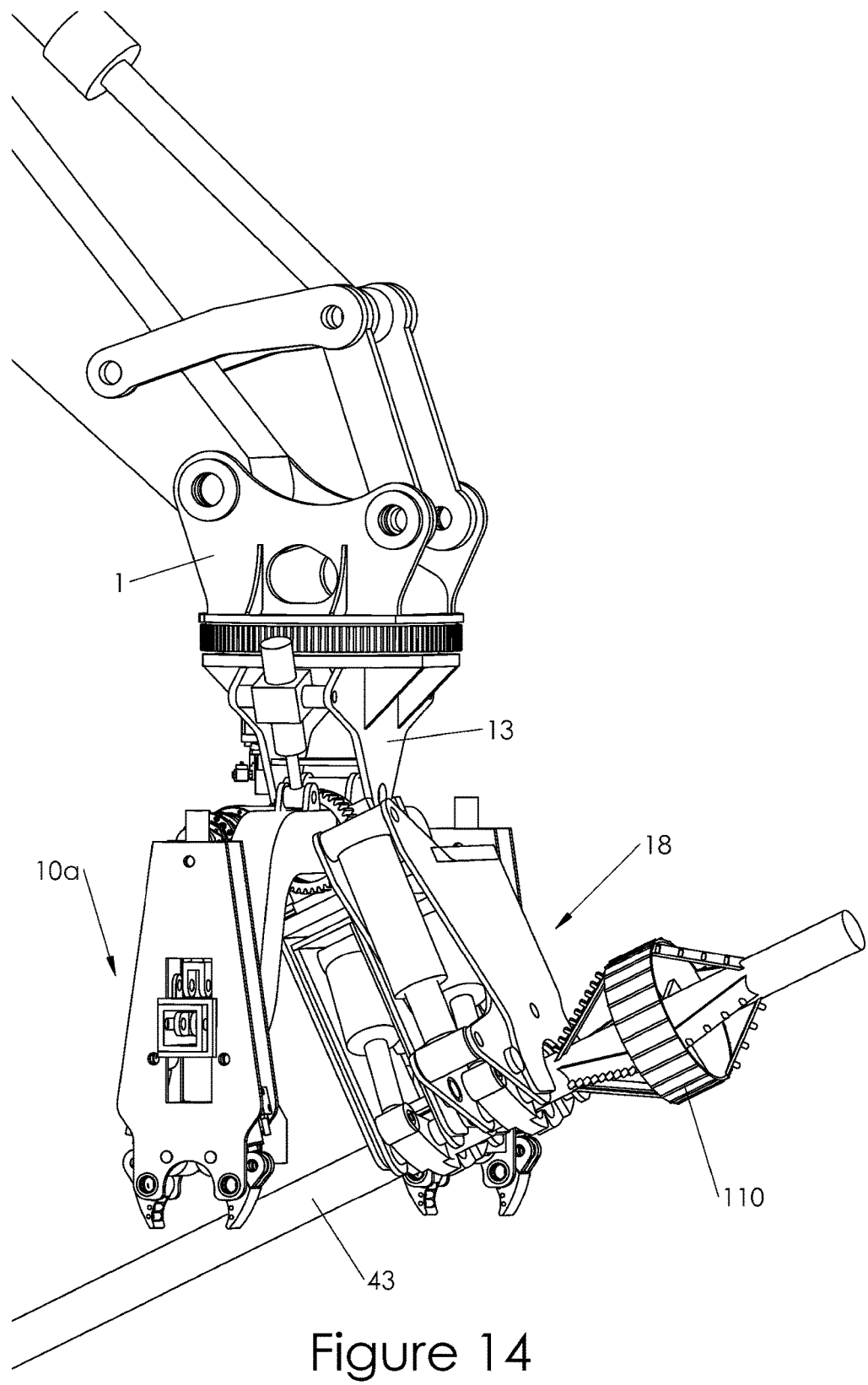
FIG. 14 illustrates the pipe break mechanism positioned to break out the reamer from the tail end of the pipe string.
Figure 15:
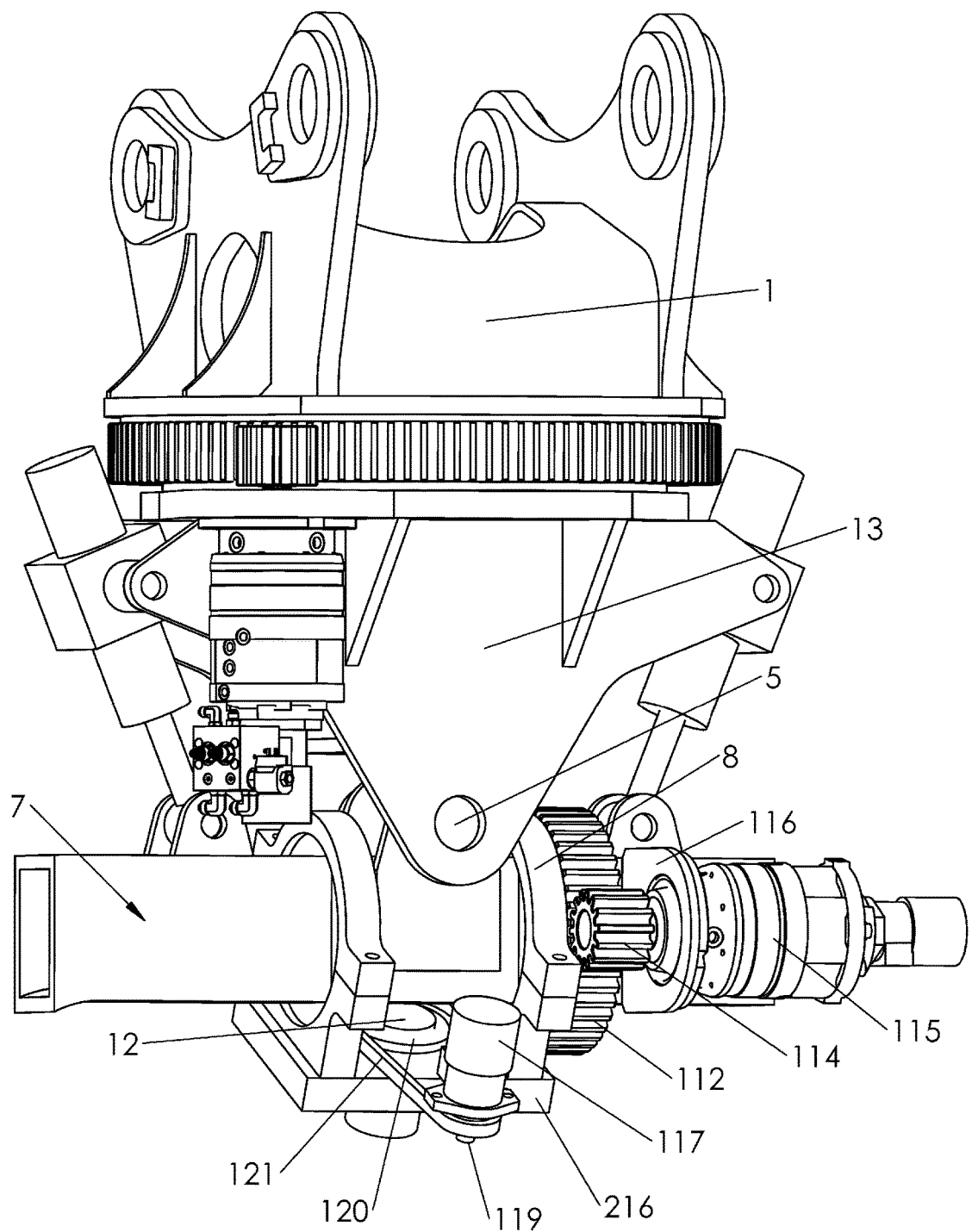
FIG. 15 is a close up view of the pillow block trunnion bearing showing details of how the pipe break mechanism can rotate and tilt.

With reference to FIGS. 13-15, the attachment 200 is shown in a position to break out the pipe 44 which is connected to the reamer 110. As should be evident from FIG. 13, because of the size of the reamer 110 and the relative positioning of the pipe break mechanism 18 and the gripping assemblies 10a, 10b, the pipe break mechanism 18 would normally be unable to be positioned over the joint between the pipe 44 and the reamer 110.

To permit the pipe break mechanism 18 to be positioned over the joint between the pipe 44 and the reamer 110, the pipe break mechanism 18 is typically rotated 90 degrees relative to the main beam 7 from its position shown in FIGS. 1-3, but can be rotated to any angle that one finds appropriate. As shown in FIG. 15, an axial pivot 12 rotatably extends through the plate 216 and is fixed to the plate 214 of the pipe break mechanism 18. A sprocket 120 is fixed to the end of the pivot 12 and a drive member 121, such as a chain or belt, is engaged with the sprocket 120. A reversible drive motor 117, for example a hydraulic, pneumatic, or electric motor, is mounted to the trunnion bearing 8 by a mounting plate 118 (see FIG. 13). A motor sprocket 119 that is driven by the motor 117 rotates the drive member 121. In operation, the motor 117 drives the sprocket 119 which drives the drive member 121 which in turn rotates the sprocket 120. This rotates the pivot 12 which is fixed to the plate 214 so that the pipe break mechanism 18 is rotated about the axis of the pivot 12. Although a motor driven rotation mechanism has been described, other rotation mechanism constructions actuated by other types of actuators, such as electrical, hydraulic or pneumatic linear actuators, can be used.

With reference to FIGS. 13 and 15, tilting of the pipe break mechanism 18 about the main beam 7 is achieved by a gear 112 that is fixed to the trunnion bearing 8. A reversible drive motor 115, for example a hydraulic, pneumatic or electric motor, is mounted on a mount plate 116 that is fixed to main beam 7. The drive motor 115 drives a pinion gear 114 which drives the gear 112. Driving of the gear 112 causes the trunnion bearing 8 to rotate which tilts the pipe break mechanism 18 about the main beam 7 to the necessary angle to line up with a reamer 110. Although a motor driven tilt mechanism has been described, other tilt mechanism constructions actuated by other types of actuators, such as electrical, hydraulic or pneumatic linear actuators, can be used.

The rotation and tilting of the pipe break mechanism 18 permits the pipe break to be positioned over the joint between the pipe 44 and the reamer 110 for breaking the joint. As shown in FIG. 13, the pipe break mechanism 18 is rotated about 90 degrees and is tilted at an angle to break the joint. Once the joint is broken, the attachment 200 can be disengaged and the pipe break mechanism 18 repositioned as shown in FIG. 1, and the attachment then moved to the pipe 44 so the gripping assemblies 10a, 10b can finish unthreading the pipe 44.

Figure 16:
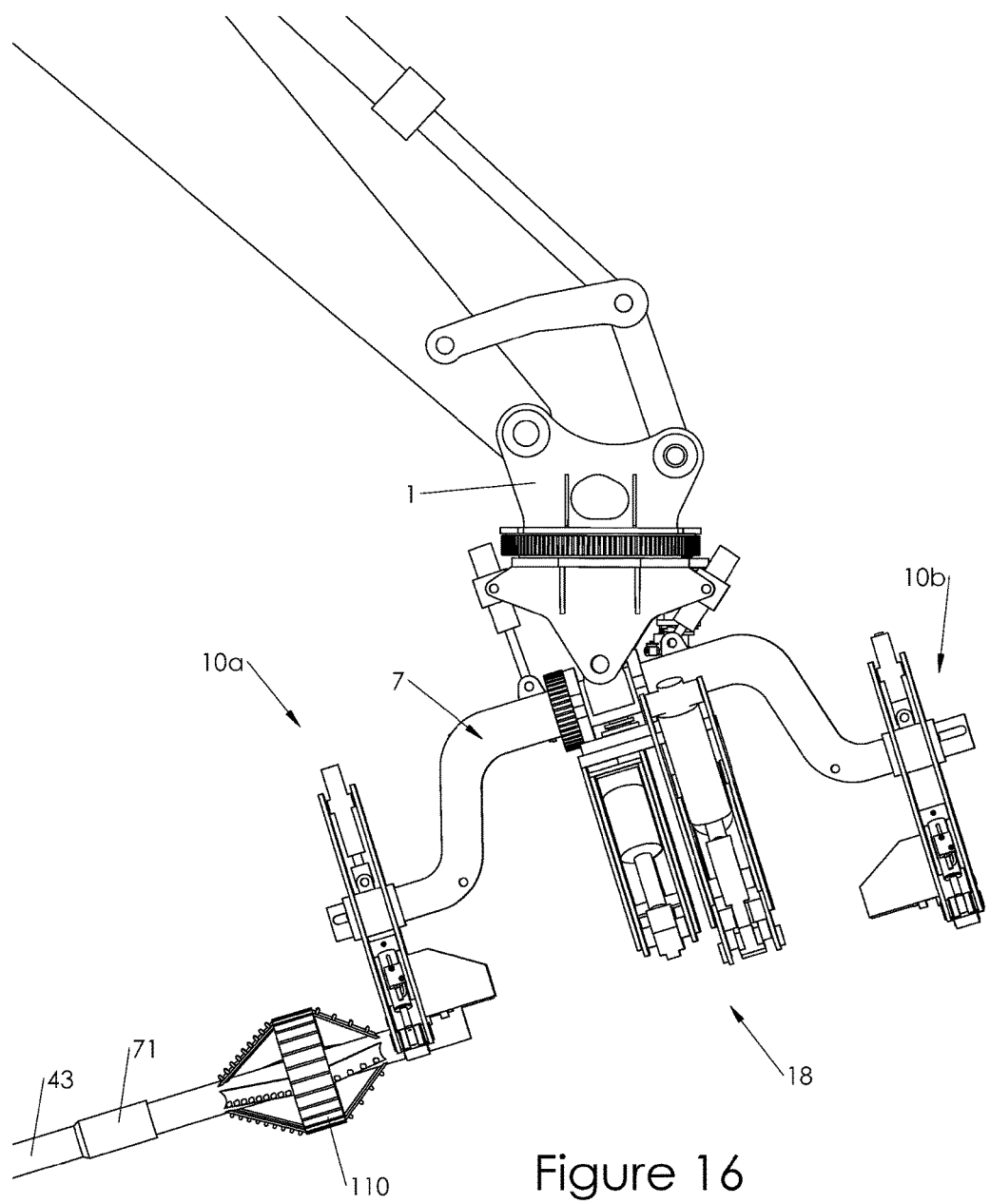
FIG. 16 illustrates unthreading of the reamer using one of the pipe roller gripping assemblies.

FIG. 14 shows the pipe break mechanism 18 rotated about 90 degrees and titled in order to break the joint between the reamer 110 and the pipe 43. Once the joint is broken, the reamer can then be unthreaded from the pipe by repositioning the attachment as shown in FIG. 16 with the gripping assembly 10a gripping the end of the reamer 110 to finish unthreading the reamer from the pipe 43.

Although the pipe break mechanism 18 is described above as being rotated about 90 degrees, the pipe break mechanism 18 can rotate any amount that one finds suitable in order to permit the attachment to clear an obstacle such as the reamer.

The attachment 200 can be used to break out or make up pipe of various diameters including, but not limited to, 4.5 inch to 8.5 inch diameter pipe. Also, the attachment 200 can be designed to operate with various torque values including, but not limited to, 30,000-60,000 lbs. of torque.

Any of the actuators described herein can be configured as hydraulic, pneumatic, electrical and/or mechanical actuators or motors. In addition, any of the drive motors described herein can be configured as electric, hydraulic, or pneumatic motors or linear actuators.

The examples disclosed in this application are to be considered in all respects as illustrative and not limitative. The scope of the invention is indicated by the appended claims rather than by the foregoing description; and all changes which come within the meaning and range of equivalency of the claims are intended to be embraced therein.

The invention claimed is:

1. A method of pipe make up and pipe break out, comprising:

attaching a pipe handling attachment to a first end of an arm of a prime mover, a second end of the arm is attached to the prime mover;

using the pipe handling attachment to make up a first pipe and a second pipe and to break out a first pipe and a second pipe, the first pipe and the second pipe having ends that are threaded for threaded connection to one another;

during pipe make up, using the pipe handling attachment to thread the end of the second pipe onto the end of the first pipe, followed by applying final torque to a predetermined torque value using the pipe handling attachment to complete the pipe make up;

during pipe break out, using the pipe handling attachment to apply a torque to break the joint between the end of the first pipe and the end of the second pipe, followed by unthreading the end of the second pipe from the end of the first pipe using the pipe handling attachment;

prior to pipe make up, using the pipe handling attachment to pick up the second pipe from a location that is separate from the prime mover and to position the end of the second pipe relative to the end of the first pipe to permit threading of the end of the second pipe onto the end of the first pipe; and after pipe break out, using the pipe handling attachment to position the second pipe on a pipe stack that is at a location that is separate from the prime mover or on the ground.

2. The method of claim 1, during pipe make up, holding the second pipe with at least one pipe roller gripping assembly that is mounted on the pipe handling attachment, and using the at least one pipe roller gripping assembly to spin the second pipe to thread the end of the second pipe onto the end of the first pipe.

3. The method of claim 2, during pipe make up, after the end of the second pipe is threaded onto the end of the first pipe, clamping the first pipe using a stationary vise section of a pipe break mechanism mounted on the pipe handling attachment and clamping the second pipe using a break out vise section of the pipe break mechanism; and applying the final torque to the predetermined torque value comprises rotating the second pipe relative to the first pipe by moving the break out vise section relative to the stationary vise section.

4. The method of claim 1, during pipe break out, clamping the first pipe using a stationary vise section of a pipe break mechanism mounted on the pipe handling attachment and clamping the second pipe using a break out vise section of the pipe break mechanism; and applying the torque to break the joint comprises rotating the second pipe relative to the first pipe by moving the break out vise section relative to the stationary vise section.

5. The method of claim 4, during pipe break out, after the joint is broken, holding the second pipe with at least one pipe roller gripping assembly mounted on the pipe handling attachment, and using the at least one pipe roller gripping assembly to spin the second pipe to unthread the end of the second pipe from the end of the first pipe.

6. The method of claim 1, wherein the prime mover is any one of an excavator, knuckle boom loader, trackhoe, or backhoe.

7. A method of pipe make up and pipe break out, comprising:

attaching a pipe handling attachment to a first end of an arm of a prime mover, a second end of the arm is attached to the prime mover;

using the pipe handling attachment to make up a first pipe and a second pipe and to break out a first pipe and a second pipe, the first pipe and the second pipe having ends that are threaded for threaded connection to one another;

using at least one pipe roller gripping assembly that is mounted on the pipe handling attachment to, during a pipe make up, pick up the second pipe, position the end of the second pipe relative to the end of the first pipe, hold the second pipe and to spin the second pipe relative to the first pipe to thread the end of the second pipe onto the end of the first pipe, and during a pipe break out, unthread the end of the second pipe from the end of the first pipe and thereafter position the second pipe on a pipe stack that is separate from the prime mover or on the ground;

using a stationary vise section of a pipe break mechanism mounted on the pipe handling attachment to clamp the first pipe and using a break out vise section of the pipe break mechanism to clamp the second pipe;

during pipe make up, rotating the second pipe relative to the first pipe in a first direction by moving the break out vise section relative to the stationary vise section; and during pipe break out, rotating the second pipe relative to the first pipe in a second direction opposite the first direction by moving the break out vise section relative to the stationary vise section.

8. The method of claim 7, wherein the pipe break mechanism is separate from the at least one pipe roller gripping assembly, and is spaced from the at least one pipe roller gripping assembly on the pipe handling attachment.

9. The method of claim 7, wherein the prime mover is any one of an excavator, knuckle boom loader, trackhoe, or backhoe.

10. A method of pipe make up and pipe break out, comprising:

attaching a pipe handling attachment to a first end of an arm of any one of an excavator, knuckle boom loader, trackhoe, or backhoe, a second end of the arm is attached to any one of the excavator, knuckle boom loader, trackhoe, or backhoe;

using the pipe handling attachment to make up a first pipe and a second pipe and to break out a first pipe and a second pipe, the first pipe and the second pipe having ends that are threaded for threaded connection to one another;

during pipe make up, using the pipe handling attachment to pick up the second pipe at a location separate from any one of the excavator, knuckle boom loader, trackhoe, or backhoe, followed by aligning the second pipe with the first pipe using the pipe handling attachment, followed by threading the end of the second pipe onto the end of the first pipe using the pipe handling attachment, followed by applying final torque to a predetermined torque value using the pipe handling attachment to complete the pipe make up; and during pipe break out, using the pipe handling attachment to apply a torque to break the joint between the end of the first pipe and the end of the second pipe, followed by unthreading the end of the second pipe from the end of the first pipe using the pipe handling attachment, followed by moving the second pipe to a location that is separate from any one of the excavator, knuckle boom loader, trackhoe, or backhoe using the pipe handling attachment.

11. The method of claim 10, wherein using the pipe handling attachment to move the second pipe to a location that is separate from any one of the excavator, knuckle boom loader, trackhoe, or backhoe comprises placing the second pipe on the ground or on a pipe stack separate from any one of the excavator, knuckle boom loader, trackhoe, or backhoe.

12. The method of claim 10, wherein the pipe handling attachment includes a pipe break mechanism that is movable with the pipe handling attachment when moving the second pipe to the location that is separate from any one of the excavator, knuckle boom loader, trackhoe, or backhoe.

* * * * *